US005701454A

United States Patent [19]
Bhargava et al.

[11] Patent Number: 5,701,454
[45] Date of Patent: Dec. 23, 1997

[54] SIMPLIFICATION OF SQL QUERIES USING GENERALIZED INFERENCE PROPAGATION AND GENERALIZED TRANSITIVE CLOSURE

[75] Inventors: Gautam Bhargava, Cupertino; Piyush Goel, Monte Sereno; Balakrishna Ragmavendra Iyer, San Jose, all of Calif.

[73] Assignee: International Business Machines Corporation, Armonk, N.Y.

[21] Appl. No.: 373,562

[22] Filed: Jan. 17, 1995

[51] Int. Cl.$^6$ .................................................. G06F 17/30
[52] U.S. Cl. ............................................................ 395/602
[58] Field of Search ...................................... 395/601, 602

[56] References Cited

U.S. PATENT DOCUMENTS

| | | | |
|---|---|---|---|
| 4,769,772 | 9/1988 | Dwyer | 395/602 |
| 4,829,427 | 5/1989 | Green | 395/604 |
| 5,091,852 | 2/1992 | Tsunchida et al. | 395/602 |
| 5,367,675 | 11/1994 | Cheng et al. | 395/602 |

OTHER PUBLICATIONS

APERS, "Optimization Algorithms for Distributed Queries", IEEE Transactions on Software Engineering, vol. SE9, No. 1, Jan. 1983, pp. 57–68.

Lohman et al., "Research Report—Query Processing in R*", IBM Research Laboratory, San Jose, CA (US) IBM Research Division, Apr. 1984, pp. 1–33.

Lafortune et al., "A State Transition Model for Distributed Query Processing", University of California, ACM transactions on Database Systems, vol. 11, No. 3, Sep. 1986 (294–322).

Kim, Won, IBM Research "On Optimizing an SQL–Like Nested Query", ACM Transactions on Database Systems, vol. 7, No. 3, Sep. 1982, pp. 443–469.

Ganski et al., "Optimization of Nested SQL Queries Revisited", ACM, 1987, pp. 23–33.

Haas et al., "Extensible Query Processing in Starburst", IBM Almaden Research Center, San Jose, CA (US), ACM 1989, pp. 377–388.

Date, C.J. & Darwen, Hugh., "Relational Database Management" Relational Database Writings 1989–1991, Part II, pp. 133–154.

Selinger et al, "Access Path Selection in a Relational Database Management System", IBM Research Division, San Jose, CA (US), ACM, 1979, pp. 23–34.

Dayal et al., "An Extended Relational Algebra with Control Over Duplicate Elimination", Computer Corporation of America, Cambridge, MA, (US), ACM 1982, pp. 117–123.

Galindo–Legaria, C., and Rosenthan, A., "How to Extend a Conventional Optimizer to Handle One– and Two–Sided Outerjoin", IEEE Proceedings of Data Engineering, pp. 402–409, 1992.

(List continued on next page.)

Primary Examiner—Thomas G. Black
Assistant Examiner—Jack M. Choules
Attorney, Agent, or Firm—Merchant, Gould, Smith, Edell, Welter & Schmidt

[57] ABSTRACT

A method and apparatus for query simplification by applying generalization inference propagation and transitive closure in SQL queries having intersection operations combined with inner and outer join operations further combined with selection and/or projection operations. First a strong set of predicates is calculated, typically a selection or join predicate which is null-intolerant. Second the strong set of attributes is used to select and replace a full, left, or right outer join operation found as the operand of an intersection operation in the query. A less expensive outer or inner join replaces the selected join and the process is repeated until no further simplification if possible. Inferences are propagated from one operand to the other of an intersection operation. Selection operators are applied through transitive closure to reduce the size of intermediate results. The transformations are applied to the query to produces a set of operations that perform more efficiently than that of the original query while providing the same results.

86 Claims, 11 Drawing Sheets

OTHER PUBLICATIONS

Galindo–Legaria, C.A., "Algebraic Optimization of Outer-join Queries", Ph.D. dissertation, Center for Research in Computing Technology, Harvard University, Cambridge, MA, 1992.

Alon Levy, Inderpal Mumick, Yehoshua Sagiv, "Query Optimization by Predicate Move–Around," Proceedings of the 20th VLDB Conference, Santiago, Chile, Sep., 1994.

Paulley, G.N. and Per–Ake Larson, "Exploiting Uniqueness in Query Optimization", CASCON, pp. 804–822, vol. II, Oct. 1993.

Pirahest, H., Hellerstein, J.M. and Hasan, W. "Extensible/Rule Based Query Rewrite Optimization in Starburst", ACM SIGMOD, pp. 39–48, San Diego, CA, Jun. 1992.

Date, C.J. "The Outer Join", Proceedings of the Second International Conference on Databases, Cambridge, England, Sep. 1983, pp. 76–106.

Dayal, Umeshwar, "Processing Queries with Quantifiers: A Horticultural Approach", Proc. ACM PODS, pp. 125–136, 1983.

Dayal, Umeshwar, "Of Nests and Trees: A Unified Approach to Processing Queries That Contain Nested Subqueries, Aggregates, and Quantifiers", VLDB, pp. 197–208, 1987.

Rosenthal, A. and Galindo–Legaria, C., "Query Graphs, Implementing Trees, and Freely–Reorderable Outerjoins", ACM SIGMOD, pp. 291–299, 1990.

SIMPLIFICATION OF SQL QUERIES USING GENERALIZED INFERENCE PROPAGATION AND GENERALIZED TRANSITIVE CLOSURE

BACKGROUND OF THE INVENTION

1. Field of the Invention

This invention relates in general to database management systems performed by computers, and in particular, to a method and apparatus for query simplification using generalized inference propagation and generalized transitive closure in SQL queries having selection, projection, join, outer join, and intersection operations.

2. Description of Related Art

Computer systems incorporating Relational DataBase Management System (RDBMS) software using a Structured Query Language (SQL) interface are well known in the art. The SQL interface has evolved into a standard language for RDBMS software and has been adopted as such by both the American Nationals Standard Organization (ANSI) and the International Standards Organization (ISO).

In RDBMS software, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies on its ability to link information from multiple tables or views together to perform complex sets of procedures with a single statement.

The current state-of-the-art in SQL query optimization provides techniques for simplifying queries based on the nature of null-intolerant predicates, as reflected in the following patent application and publication, both of which are incorporated by reference herein:

1. U.S. patent application Ser. No. 08/326,461, filed Oct. 20, 1994, by G. Bhargava, P. Goel, and B. Iyer, entitled "METHOD AND APPARATUS FOR REORDERING COMPLEX SQL QUERIES CONTAINING INNER AND OUTER JOIN OPERATIONS," (hereinafter referred to as [BHAR94]); and 2. Galindo-Legaria, C. A., "Algebraic optimization of outer join queries," Ph.D. dissertation, Dept. of Applied Science, Harvard University, Cambridge, 1992, (hereinafter referred to as [GALI92b]).

However, these prior art techniques do not simplify queries in the presence of intersection operators. Further, these prior art techniques do not include any scheme for inference propagation.

One prior art simplification technique uses selection predicates for "removing arrows". As explained in the following publication: Galindo-Legaria, C., and Rosenthal, A., "How to extend a conventional optimizer to handle one- and two-sided outer join," *Proceedings of Data Engineering*, pp. 402–409, 1992, (hereinafter referred to as [GALI92a]), selections may cause the replacement of full and one-sided outer joins with one-sided outer joins and joins, respectively. These simplifications are based on the recursive application of the following identities for relations $X_1 = (R_1, V_1, E_1)$ and $X_2 = (R_2, V_2, E_2)$:

$$\sigma_p(X_1 \rightarrow X_2) = \sigma_p(X_1 \bowtie X_2)$$

wherein $R_1$ and $R_2$ are non-empty sets of real attributes, $V_1$ and $V_2$ are non-empty sets of virtual attributes, $E_1$ and $E_2$ are extensions of the relations, $\sigma_p$ is a selection operator with predicate p, $\rightarrow$ is a left outer join operator, $\bowtie$ is a join operator, $sch(p) \subseteq R_2$, and p is null-intolerant in $R_2$; and:

$$\sigma_p(X_1 \leftrightarrow X_2) = \sigma_p(X_1 \rightarrow X_2)$$

wherein $R_1$ and $R_2$ are non-empty sets of real attributes, $V_1$ and $V_2$ are non-empty sets of virtual attributes, $E_1$ and $E_2$ are extensions of the relations, $\sigma_p$ is a selection operator with predicate p, $\leftrightarrow$ is a full outer join operator, $\rightarrow$ is a left outer join operator, $sch(p) \subseteq R_1$, and p is null-intolerant in $R_1$.

Another prior art simplification technique for "removing arrows" uses predicates for join and outer join operators. The following identities are used recursively to replace full outer join and one-sided outer join operations with one-sided outer join and join operations, respectively. These identities are a formalization and extension of the ideas presented in [GALI92b]. Note, however, that [GALI92b] does not consider outer join predicates that reference more than two relations.

Let $X_i = c$, where $1 \leq i \leq 3$, be relational expressions and let p be a null-intolerant predicate. Then, $$X_1 \underset{\bowtie}{\overset{p}{}} (X_2 \rightarrow X_3) = X_1 \underset{\bowtie}{\overset{p}{}} (X_2 \bowtie X_3)$$

if $sch(p) \cap R_3 \neq \emptyset$;

$$X_1 \underset{\bowtie}{\overset{p}{}} (X_2 \leftrightarrow X_3) = X_1 \underset{\bowtie}{\overset{p}{}} (X_2 \rightarrow X_3)$$

if $sch(p) \cap R_2 \neq \emptyset$;

$$X_1 \underset{\bowtie}{\overset{p}{}} (X_2 \leftrightarrow X_3) = X_1 \underset{\bowtie}{\overset{p}{}} (X_2 \bowtie X_3)$$

if $sch(p) \cap R_2 \neq \emptyset$ and $sch(p) \cap R_3 \neq \emptyset$;

$$X_1 \overset{p}{\rightarrow} (X_2 \rightarrow X_3) = X_1 \overset{p}{\rightarrow} (X_2 \bowtie X_3)$$

if $sch(p) \cap R_3 \neq \emptyset$;

$$X_1 \overset{p}{\leftrightarrow} (X_2 \rightarrow X_3) = X_1 \overset{p}{\rightarrow} (X_2 \rightarrow X_3)$$

if $sch(p) \cap R_2 \neq \emptyset$; and $$X_1 \overset{p}{\rightarrow} (X_2 \leftrightarrow X_3) = X_1 \overset{p}{\rightarrow} (X_2 \bowtie X_3)$$

if $sch(p) \cap R_2 \neq \emptyset$ and $sch(p) \cap R_3 \neq \emptyset$.

After applying the above identities, the original query is transformed into a form where all "redundant" (full) outer join operations have been removed.

The following publications present techniques that exploit certain properties of intersection distinct operators to transform them to joins:

1. Pirahesh, H., Hellerstein, J. M. and Hasan, W., "Extensible/rule based query rewrite optimization in STARBURST," *SIGMOD*, pp. 39–48, San Diego, Calif., June 1992, (hereinafter referred to as [PIRA92]); and 2. Paulley, G. N. and Larson, P.-A., "Exploiting uniqueness in query optimization," *CASCON*, pp. 804–822, 822, Vol. II, October 1993, (hereinafter referred to as [PAUL93]).

However, the techniques discussed by these publications are not the same as disclosed by the present invention, although they are still applicable after the simplifications proposed by the present invention have been applied.

Finally, the prior art on predicate transitive closure consists of identifying equivalence classes of attributes that are equated though equi-join predicates and then applying the given selection conditions on any of them to the whole class, as described in the following publication Alon Levy, Inderpal Mumick, Yehoshua Sagiv, "Query Optimization by Predicate Move-Around," *Proceedings of the 20th VLDB Conference*, Santiago, Chile, September, 1994, (hereinafter referred to as "[LEVY94]"). This idea can be formally stated in the form of the following identities. The first two of these identities constitute push-up and push-down rules for σ. Let $X=(R_X, V_X, E_X)$ and $Y=(R_Y, V_Y, E_Y)$ be relational expressions, p be a selection predicate, and $J_{XY}$ be a null-intolerant equi-join predicate. Then, $$\sigma_p(X) \stackrel{J_{XY}}{\bowtie} Y = \sigma_p\left(X \stackrel{J_{XY}}{\bowtie} Y\right)$$

where $sch(p) \subseteq R_X$;

$$X \stackrel{J_{XY}}{\bowtie} \sigma_p(Y) = \sigma_p\left(X \stackrel{J_{XY}}{\bowtie} Y\right)$$

where $sch(p) \subseteq R_Y$;

$$\sigma_p\left(X \stackrel{J_{XY}}{\bowtie} Y\right) = \sigma_p(X) \stackrel{J_{XY}}{\bowtie} \sigma_{p'}(Y)$$

where $sch(p) \subseteq R_X$, $sch(p') \subseteq R_Y$, and p' is obtained from p by replacing every clause of the form $X_i \theta c$ by $Y_j \theta c$, where θ is a relational operator, $X_i = Y_j$ is a clause in $J_{XY}$; and $$\sigma_p\left(X \stackrel{J_{XY}}{\bowtie} Y\right) = \sigma_{p'}(X) \stackrel{J_{XY}}{\bowtie} \sigma_p(Y)$$

where $sch(p) \subseteq R_Y$, $sch(p) \subseteq R_X$, and p' is obtained from p by replacing every clause of the form $Y_j \theta c$ by $X_i \theta c$, where $X_i = Y_j$ is a clause in $J_{XY}$. However, these identities work for join-only queries.

Thus, there is a need in the art for query simplification methods that work for queries involving (full) outer joins operators, intersection operators, as well as join operators.

SUMMARY OF THE INVENTION

To overcome the limitations in the prior art described above, and to overcome other limitations that will become apparent upon reading and understanding the present specification, the present invention discloses a method and apparatus for query simplification using generalized inference propagation and generalized transitive closure in SQL queries having selection, projection, join, outer join, and intersection operations.

An object of the present invention is to propagate inferences about one operand of an intersection operation to the other operand, and then to use this information to simplify the query by transforming outer join operations to less expensive joins. Another object of the present invention is to apply selection operators through transitive closure to make intermediate results of SQL queries smaller. Yet another object of the present invention is to apply "null-intolerance" properties of join predicates in the presence of intersection operators to further simplify SQL queries.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
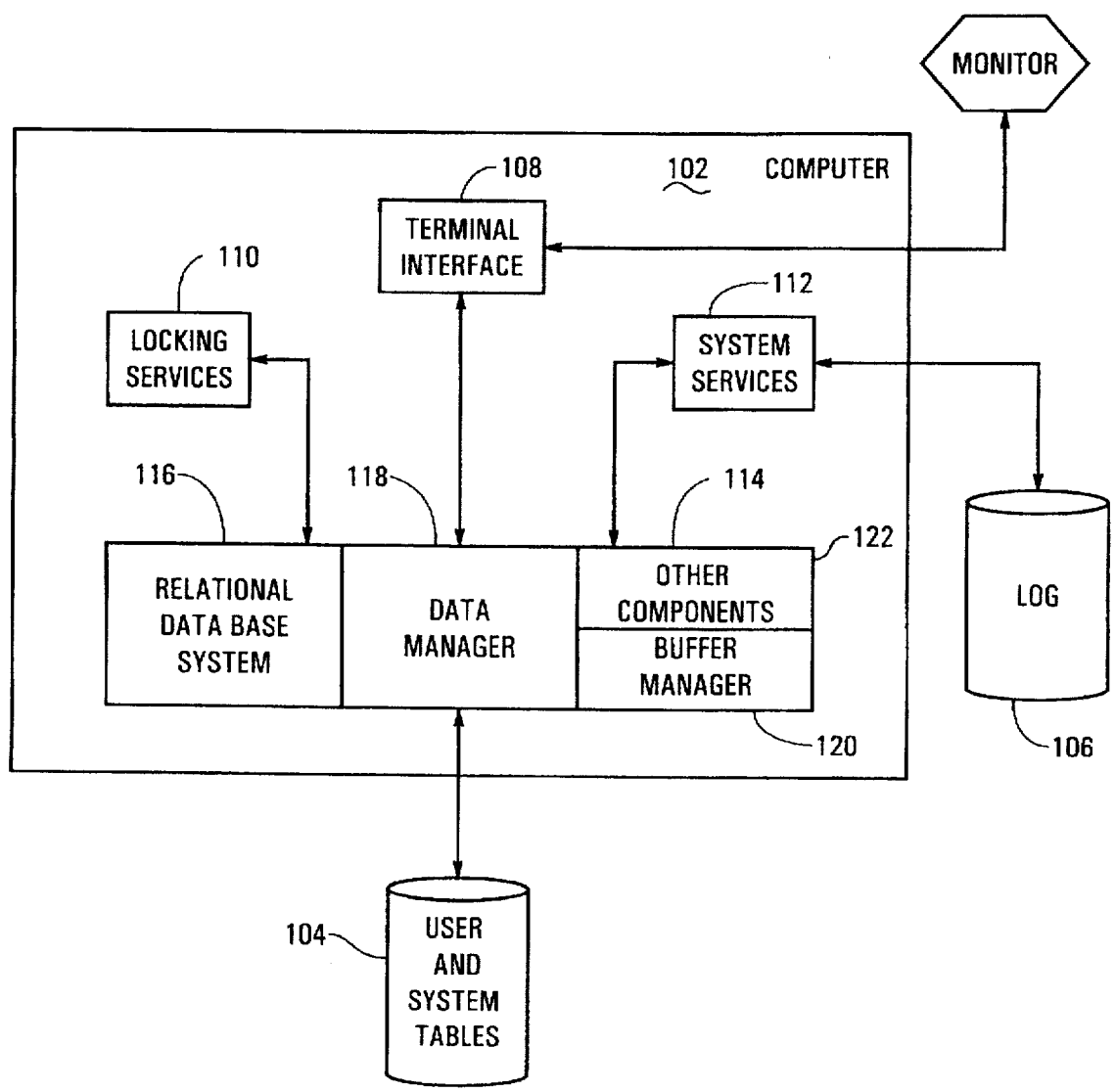
FIG. 1 illustrates the computer hardware environment of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

DEFINITIONS

Following are definitions for a number of terms used in SQL queries. These definitions are required for an understanding of later portions of the present specification. A complete algebra for relations with duplicates is included in [BHAR94], which is incorporated by reference. Only the more pertinent definitions are included here, suitably modified to make the presentation more readable.

Tuple

A tuple t is a mapping from a finite set of attributes, $R \cup V$, to a set of atomic (possibly null) values, where R is a non-empty set of real attributes and V is a non-empty set of virtual attributes, $R \cap V = \emptyset$, and the mapping t maps at least one virtual attribute $v \in V$ to a non-null value. For an attribute set X, t[X] represents the values associated with attributes X under the mapping t, where $X \subseteq R \cup V$ and $X \neq \emptyset$.

The motivation behind the distinction between real and virtual attributes is to emphasize the difference between the real attributes available for manipulation (to the user of the RDBMS) and the virtual attributes used (by the RDBMS) for bookkeeping only. The set of real attributes of a tuple is the same as the schema of the tuple in the traditional relational algebra. These attributes are accessible to users and can be referenced externally, e.g., in user queries, etc. On the other hand, virtual attributes are (at times) used to provide unique conceptional tuple-ids to tuples, and are not accessible to users and cannot be referenced externally.

Relation

A relation r is a triple (R, V, E) where R is a non-empty set of real attributes, V is a non-empty set of virtual attributes, and E, the extension of relation r, is a set of tuples such that:

$$(\forall t_1 \in E)(\forall t_2 \in E)(t_1 \neq t_2 \rightarrow t_1[V] \neq t_2[V])$$

In this definition, $R \cup V$ is called the schema of relation r.

Predicate

A predicate p over a set of real attributes sch(p), called the schema of p, is a total mapping from tuples to the Boolean values {TRUE, FALSE}, where sch(p) is the minimum set of attributes such that for all tuples $t_1$ and $t_2$:

$$(t_1[sch(p)]=t_2[sch(p)] \rightarrow p(t_1)=p(t_2)).$$

For a tuple t with real schema R⊇sch(p), p(t) is TRUE if and only if (∀A ∈sch(p)) (i.e., substitution of t[A] for A in p causes it to evaluate to TRUE).

Null-intolerant

A predicate p is null-intolerant if p evaluates to FALSE for tuples undefined on one or more attributes in sch(p). More formally, p is null-intolerant if:

$$(\forall t)(\exists A \in sch(p))(t[A]=NULL \rightarrow p(t)=FALSE)$$

Algebraic Operators

Following are definitions for algebraic operators used in SQL queries. These definitions are required for an understanding of later portions of the present specification.

Projection

The projection, $\pi^a_X(r)$, of relation r onto attributes X is the relation (X,V, E') where X⊆R and:

$$E'=\{t.v|(\exists t' \in E)(t=t'[X] \wedge v=t'[V])\}$$

The $\pi^a$ operator is a projection operator that does not remove "duplicates" in the real attributes part of the source expression. The superscript a in $\pi^a$ denotes the fact that all the virtual attributes of the source expression are included in the virtual schema of the result expression. For ease of reading, the superscript a is omitted from $\pi^a$ whenever there is no ambiguity, so it can be written simply as $\pi$.

The projection, $\pi^c_{X_R X_V}(r)$, of relation r on attributes $X_R X_V$ is the relation ($X_R$, $X_V$, E'), where $X_R \subseteq R$, $X_V \subseteq V$ and:

$$E'=\{t.v|(\exists t' \in E)(t=t'[X_R] \wedge v=t'[X_v])\}$$

In contrast to $\pi$, $\pi^c$ allows a choice in the selection of the virtual attributes from the source expression.

Delta-Projection

The delta-projection, $\delta_{X_R X_V}(r)$, of relation r on attributes $X_R X_V$ is the relation ($X_R X_V$, $V_{new}$, E'), where $X_R \subseteq R$, $X_V \subseteq V$, and:

$$E'=\{t(\exists t' \in E)(t[X_R X_V]=t'[X_R X_V] \wedge t[V_{new}]=\text{a new unique value})\}$$

which is a new, unique value. The $\delta$ operator models the "SELECT DISTINCT . . . " construct of SQL which allows elimination of "duplicates" from a relation. The $\delta$ operator is called the distinct projection operator and produces a result relation which has distinct values on the attributes $X_R X_V$ and a new virtual attribute.

Selection

The selection, $\sigma_p(r)$, of relation r on predicate p is the relation (R, V, E'), where sch(p)⊆R, and:

$$E'=\{t(t \in E) \wedge p(t)\}$$

Union Compatible

A relation $r_1=(\{A_1, A_2, \ldots, A_n\}, V, E_1)$ is said to be union compatible with relation $R_2=(\{B_1, B_2, \ldots, B_n\}, V, E_2)$ if there exists a permutation p of the numbers 1, 2, . . . , n such that domain $(A_i)$=domain $(B_{pi})$, for $1 \leq i \leq n$. That is, the attributes of $r_1$ and $r_2$ can be ordered such that the domains of the first attributes of $r_1$ and $r_2$ are the same, the domains of the second attributes of $r_1$ and $r_2$ are the same, and so on.

Union and Outer Union

The union, $r_1 \cup r_2$, of relations $r_1$ and $r_2$ is the relation (R, V, $E_1 \cup E_2$). The outer union, $r_1 \uplus r_2$, is the relation ($R_1 \cup R_2$, $v_1 \cup v_2$, E'), where:

$$E'=\{t|(\exists t' \in E_1)(t[R_1 V_1]=t' \wedge (\forall a \in (R_2-R_1) \cup (v_2-v_1))(t[A]=NULL))$$
$$\vee (\exists t'' \in E_2)(t[R_2 V_2]=t'' \wedge (\exists A \in (R_1-R_2) \cup (v_1-v_2))(t[A]=NULL))\}$$

Note that rows in $r_1 \uplus r_2$ are padded with nulls for those attributes that are not present either in relation $r_1$ or in relation $r_2$.

Additional Algebraic Operators

In the following definitions, it is assumed that if predicate p is associated with join/outer/full outer join of relations $r_1$ and $r_2$ such that sch(p)∩$R_1 \neq \emptyset$, sch(p)∩$R_2 \neq \emptyset$, and sch(p)⊆$R_1 \cup R_2$.

Join

The join, $$r_1 \underset{\bowtie}{\overset{p}{}} r_2,$$

of relations $r_1$ and $r_2$ is the relation ($R_1 R_2$, $V_1 V_2$, E'), where:

$$E'=\{t|t \in (E_1 \times E_2) \wedge p(t)\}$$

Left and Right Outer Joins

The left outer join, $$r_1 \overset{p}{\rightarrow} r_2,$$

is the relation ($R_1 R_2$, $V_1 V_2$, E'), where:

$$E = \left( E_1 \underset{\bowtie}{\overset{p}{}} E_2 \right) \uplus \left( E_1 - \pi^c_{R_1 V_1}\left( E_1 \underset{\bowtie}{\overset{p}{}} E_2 \right) \right)$$

Relation $r_1$ in the above definition is called the preserved relation and relation $r_2$ is called the null supplying relation.

The right outer join, $$r_1 \overset{p}{\leftarrow} r_2,$$

can similarly be defined in which $r_1$ is the null supplying relation and $r_2$ is the preserved relation.

Full Outer join

The full outer join, $$r_1 \overset{p}{\leftrightarrow} r_2,$$

of relations $r_1$ and $r_2$ is the relation ($R_1 R_2$, $V_1 V_2$, E'), where:

$$E = \left( E_1 \underset{\bowtie}{\overset{p}{}} E_2 \right) \uplus \left( E_1 - \pi^c_{R_1 V_1}\left( E_1 \underset{\bowtie}{\overset{p}{}} E_2 \right) \right) \uplus \left( E_2 - \pi^c_{R_2 V_2}\left( E_1 \underset{\bowtie}{\overset{p}{}} E_2 \right) \right)$$

Equivalence

Values $v_1$ and $v_2$ are said to be equivalent, which is denoted as $v_1 \equiv v_2$, if both $v_1$, $v_2$ are non-NULL and $v_1 = v_2$, or if both $v_1$, $v_2$ are NULL.

Intersect Distinct

Let $r_1=(\{A_1, A_2, \ldots, A_n\}, V, E_1)$ and $r_2=(\{B_1, B_2, \ldots, B_n\}, V, E_2)$ be two union compatible relations. Then, the intersect distinct, $r_1 \cap_d r_2$, of $r_1$ and $r_2$ is the relation ($\{C_1, C_2, \ldots, C_n\}$, V, E), where each $C_i$ is a possibly renamed version of the union compatible attribute pair $(A_i, B_i)$, $1 \leq i \leq n$, and $$E=\{t|(\exists t_1 \in E_1)(\exists t_2 \in E_2)(\forall i)(t[C_i] \equiv t_1[A_i] \wedge t[C_i] \equiv t_2[B_i]) \wedge t[V] \text{ is a new unique value}\}$$

The intersect distinct operation retains the common tuples in relations $r_1$ and $r_2$. If a tuple $t_1 \in E_1$ contains null value in attribute $A_i$ and $t_2 \in E_2$ contains null value in attribute $B_j$, $1 \leq i \leq n$, and identical non-null values in the remaining attributes, then $t_1$ and $t_2$ are considered equivalent and only a single copy is retained in the result. In case there are duplicate tuples in either of the operands, only one copy of the common tuple is retained in the result. In contrast, the intersect all operator, denoted as $\cap_a$, retains "some" of the duplicate copies of the common tuples, subject to the "minimum rule". More precisely, in two union compatible relations $r_1$ and $r_2$, if a tuple t appears i times in $r_1$ and j times in $r_2$, then t appears min {i,j} times in the result relation $r_1 \cap_a r_2$.

Expressions and expression trees

The following provides a recursive definition of expressions.

1. If $r=(R, V, E)$ is a relation, then r is an expression. Henceforth, the shorthand notation X will be used to represent the expression $X=(R_x, V_x, E_x)$.

2. If $X=(R_x, V_x, E_x)$ is an expression, then $\pi^a_{x'}(e)$ is an expression, where $X' \subseteq R_x$.

3. If $X=(R_x, V_x, E_x)$ is an expression, then $\delta_{X_R X_V}(e)$ is an expression, where $X_R \subseteq R_x$ and $X_V \subseteq V_x$.

4. If $X=(R_x, V_x, E_x)$ is an expression, then $\sigma_p(X)$ is an expression, where $sch(p) \subseteq R_x$.

5. If $X=(R_x, V_x, E_x)$ and $Y=(R_y, V_y, E_y)$ are expressions, then $$X \overset{p}{\odot} Y$$

is an expression, where:

$$\overset{p}{\odot} \in \left\{ \overset{p}{\bowtie}, \overset{p}{\leftarrow}, \overset{p}{\leftrightarrow}, \overset{p}{\rightarrow}, \cap, \cap_a \right\}$$

and p is a predicate such that $sch(p) \cap R_x \neq \emptyset$, $sch(p) \cap R_y \neq \emptyset$, and $sch(p) \subseteq R_x \cup R_y$.

6. If $X=(R_x, V_x, E_x)$ is an expression, then so is (X), where $(X)=(R_x, V_x, E_x)$. This is termed parenthesization, and is required due to the fact that some of the binary operations defined above are not fully associative. Parenthesization determines the evaluation order so that expressions can be evaluated unambiguously. However, whenever there is no ambiguity, parentheses will be dropped freely.

An expression can also be represented by a corresponding expression tree in which the inner nodes are the operators occurring in the expression and the leaves are the base relations referenced in the expression. Let $$\overset{p}{\odot}$$

denote one of the binary operators defined in the previous section, then an expression tree T with left sub-tree $T_1$, right sub-tree $T_r$ and root $$\overset{p}{\odot}$$

is denoted by:

$$\left( T_l \overset{p}{\odot} T_r \right)$$

Henceforth, the two equivalent representations are used interchangeably.

OVERVIEW

The present invention discloses a method and apparatus for simplification of SQL queries using generalized inference propagation. The presence of intersection operations in queries permits the present invention to propagate inferences about one operand of the intersection operation to the other operand, in order to simplify the query by transforming outer join operations to less expensive joins. Further, by applying selection operators through transitive closure, the present invention can make intermediate results of SQL queries smaller. Finally, by applying "null-intolerance" properties of join predicates in the presence of intersection operators, the present invention can further simplify SQL queries.

The first major aspect of the present invention is the use of "generalized inference propagation" to simplify SQL queries. An intersection operator in an SQL query produces tuples that belong to both its input operands. Two tuples are deemed to be equal if, for every attribute, they have either the same non-null value or are both null. This property of the intersection operator, along with the "null-intolerant" nature of (outer) join predicates, allows the present invention to simplify queries by replacing expensive outer join operations with cheaper inner joins, etc. Also, since the intersection operator retains tuples that exist in both its operands, the present invention can apply any known assertion about one of the operands to the other. For example, if it is known that one of the operands of the intersection operator has non-null values for an attribute, then all tuples from the other operand that contain nulls in this attribute can be "filtered" away by appropriate selection or by changing an intermediate operator.

The second major aspect of the present invention is the use of "generalized transitive closure" to simplify SQL queries. In the prior art, optimizers use a technique known as "predicate transitive closure" for the purpose of introducing additional, logically correct, selection predicates into the query expression. This helps in reducing the size of the intermediate relations and, consequently, the query evaluation cost. However, for queries that include an outer join operation, the equivalence-class-based transitive closure method does not work. Further, unlike join-only queries, it is not always correct for outer join operations to push the selection predicate down close to the relation on which the selection predicate is specified. For example:

$$\sigma_{Y_1=x}\left( X \overset{X_1=Y_1}{\rightarrow} Y \right) \neq X \overset{X_1=Y_1}{\rightarrow} \sigma_{Y_1=x}(Y))$$

However, the present invention introduces cost-reducing, logically correct selections into query expressions involving (full) outer joins. The present invention uses such generalized transitive closure to simplify SQL queries.

HARDWARE ENVIRONMENT

FIG. 1 illustrates an exemplary computer hardware environment that could be used with the present invention. In the exemplary environment, a computer system 102 is comprised of one or more processors connected to one or more electronic storage devices 104 and 106, such as disk drives, that store one or more relational databases.

Operators of the computer system 102 use a standard operator interface 108, such as IMS/DB/DC, CICS, TSO, OS/2 or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS)

software. In the preferred embodiment of the present invention, the RDBMS software comprises the DB2 product offered by IBM for the MVS or OS/2 operating systems. Those skilled in the art will recognize, however, that the present invention has application to any RDBMS software that uses SQL.

As illustrated in FIG. 1, the DB2 architecture for the MVS operating system includes three major components: the IMS Resource Lock Manager (IRLM) 110, the Systems Services module 112, and the Database Services module 114. The IRLM 110 handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing log data sets 106, gathering statistics, handling startup and shutdown, and providing management support.

At the center of the DB2 architecture is the Database Services module 114. The Database Services module 114 contains several submodules, including the Relational Database System (RDS) 116, the Data Manager 118, the Buffer Manager 120 and other components 122 such as an SQL compiler/interpreter. These submodules support the functions of the SQL language, i.e., definition, access control, retrieval, and update of user and system data.

INTERACTIVE SQL EXECUTION

Figure 2:
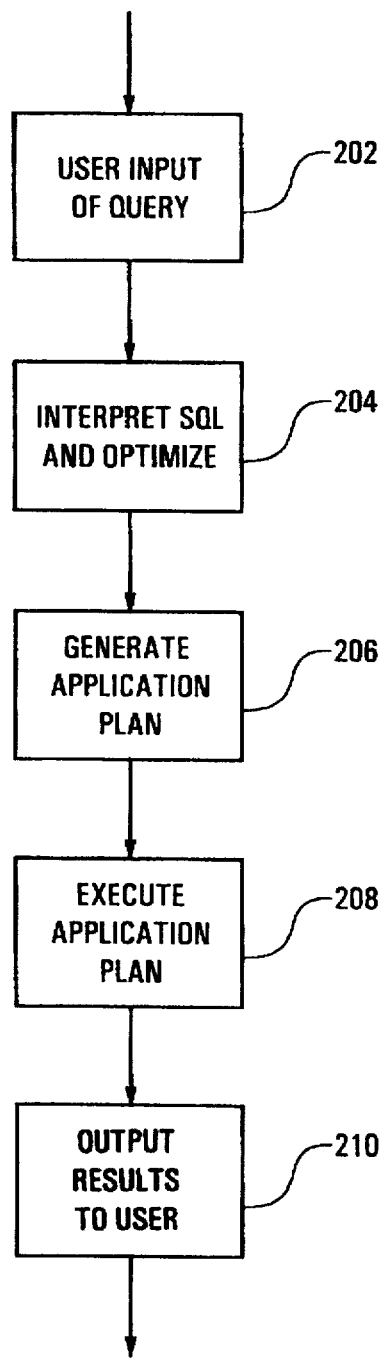
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 202 represents the input of SQL statements into the computer system 102 from the user. Block 204 represents the step of compiling or interpreting the SQL statements. An optimization function within block 204 may transform the SQL query in a manner described in more detail later in this specification. Block 206 represents the step of generating a compiled set of runtime structures called an application plan from the compiled SQL statements. Generally, the SQL statements received as input from the user specify only the data that the user wants, but not how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results of the application plan to the user.

EMBEDDED/BATCH SQL EXECUTION

Figure 3:
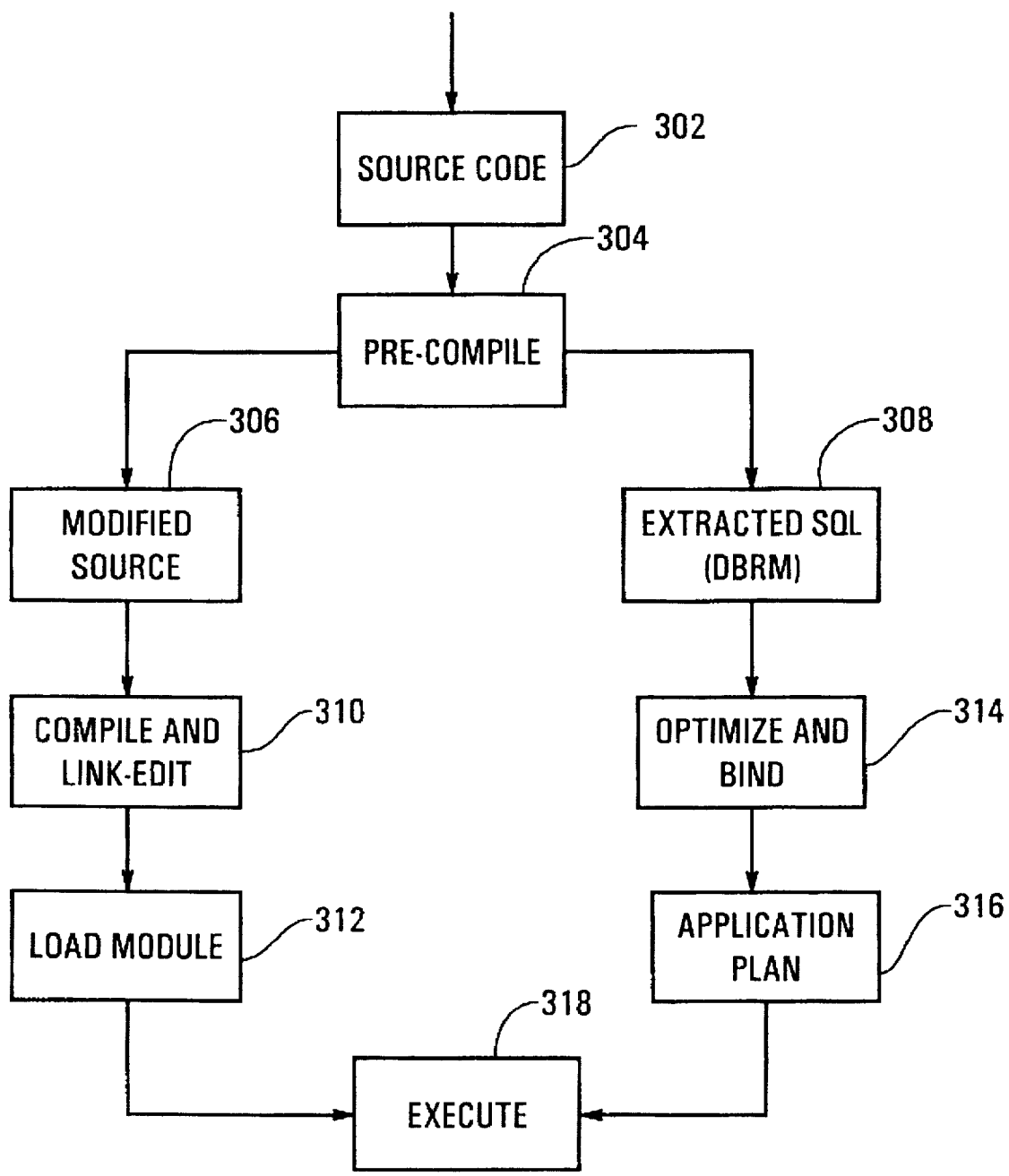
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to DB2, which the pre-compile step 304 inserts in place of SQL statements. The DBRM 308 consists of the SQL statements from the program source code 302. A compile and link-edit step 310 uses the modified source module 306 to produce a load module 312, while an optimize and bind step 314 uses the DBRM 308 to produce a compiled set of runtime structures for the application plan 316. As indicated above in conjunction with FIG. 2, the SQL statements from the program source code 302 specify only the data that the user wants, but not how to get to it. The optimize and bind step 314 may reorder the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

SQL QUERY OPTIMIZATION

Figure 4:
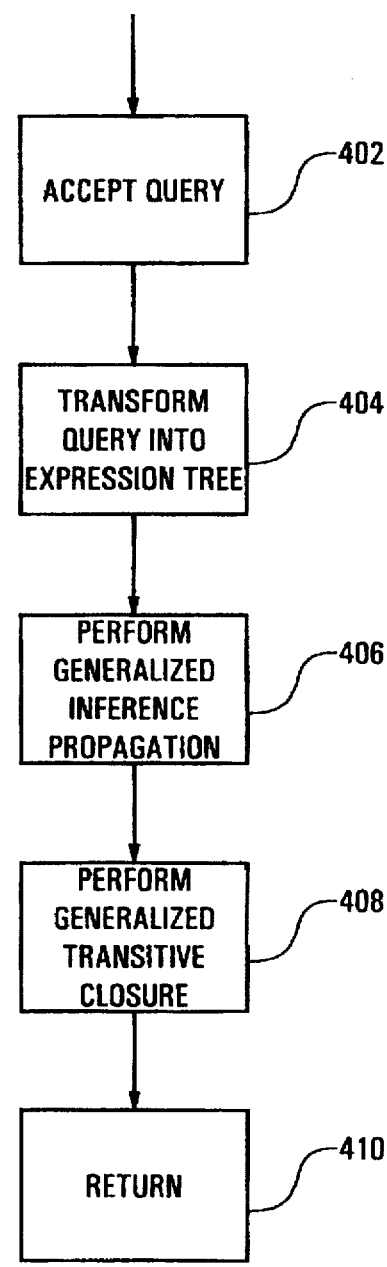
FIG. 4 is a flowchart illustrating the method of optimizing SQL queries of the present invention.

FIG. 4 is a flowchart illustrating the method of optimizing SQL queries in steps 204 of FIG. 2 and 314 of FIG. 3 according to the present invention. Block 402 represents the acceptance of the SQL query. Block 404 represents the translation of the query into an expression tree. Block 406 represents the RDBMS software performing the generalized inference propagation, as described in more detail below in conjunction with FIGS. 5A–5H. Block 408 represents the RDBMS software performing the generalized transitive closure, as described in more detail below. After these query transformation steps are performed, block 410 returns control to block 204 in FIG. 2 or block 314 in FIG. 3 for subsequent processing steps, including the execution of the SQL query against the relational database and the output of the result table to the user.

GENERALIZED INFERENCE PROPAGATION

FIGS. 5A–5H together are a flowchart describing the generalized inference propagation method that determines which of the "component" attribute pairs of the "p* intersection-predicate" become join-reduced and then uses simplification identities to simplify the query.

For example, consider the relations $r_1, r_2, r_3,$ and $r_4$ having schemas $L_1L_2, L_3L_4, R_1,$ and $R_2R_3R_4$, respectively. Then, an application of inference propagation according to the present invention would simplify a query expression like:

$$\left( \sigma_{L_2 = A(r_1)} \overset{L_1 = L_3}{\underset{\rightarrow}{}} r_2 \right) \cap_\epsilon \left( r_3 \overset{R_1 = R_4}{\underset{\rightarrow}{}} r_4 \right)$$

to:

$$\left( \sigma_{L_2 = A(r_1)} \overset{L_1 = L_3}{\underset{\bowtie}{}} r_2 \right) \cap_\epsilon \left( r_3 \overset{R_1 = R_4}{\underset{\bowtie}{}} r_4 \right)$$

The latter expression can then be made to execute even more efficiently by applying generalized transitive closure of selection operators (as described in more detail hereinafter).

Strong Attributes

An attribute A is said to be strong if all tuples defined on schemas containing A have non-null values for attribute A. Typically, attributes are strong if they are referenced through null-intolerant selection or join predicates. For example, attributes $A_1$ and $B_1$ in the relational expression $$A_1 = B_1$$
$$r \bowtie s$$

are strong.

Strongly Bound Attributes

A real attribute A is said to be strongly bound if all tuples defined on schemas containing A have exactly the same non-null value for attribute A. Typically, an attribute A in the real schema of expression σ gets strongly bound when $\sigma_p(e)$ assigns a constant value to attribute A∈sch(p).

Notation

With regard to notation, strongSet(r) is used to denote the set of strong/strongly bound attributes in the (sub) expression represented by (sub)tree T. In addition, if $\odot_r$ is the root of the (sub)tree corresponding to (sub)expression e, then the shorthand notation sch($\odot_r$) is used to represent sch(e). Finally, for any attribute A in the schema of one of the operands of $\cap_d$, $\cap_a$, the notation Compat(A) is used to represent the corresponding union-compatible attribute from the other operand.

Flowchart

Following is a detailed description of the flowchart of FIGS. 5A–5H, which performs query expression simplification via inference propagation in the expression tree for a given query expression.

Figure 5A:
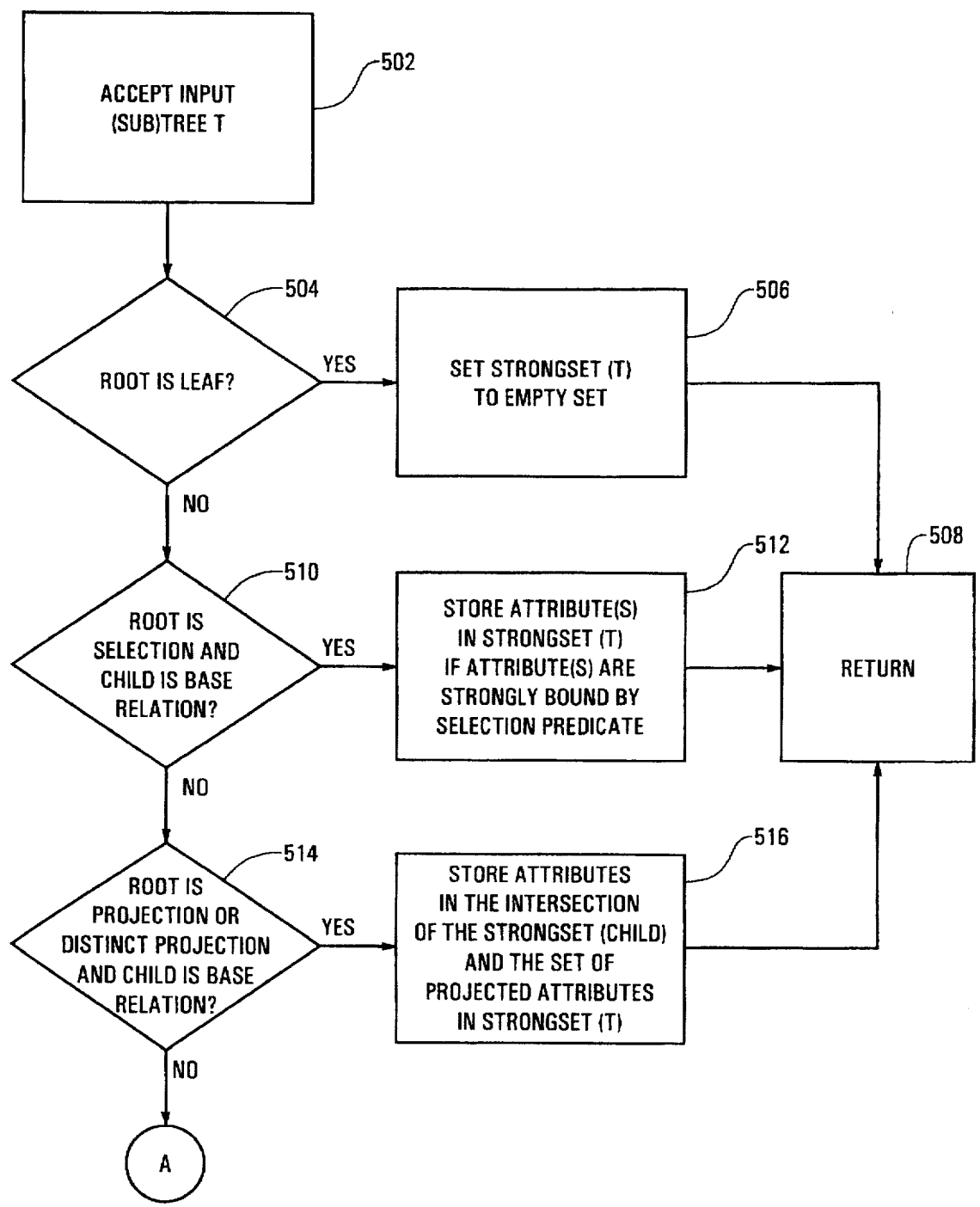
FIGS. 5A–5H together are a flowchart describing the generalized inference propagation method that determines which of the "component" attribute pairs of the "p* intersection-predicate" become join-reduced and then uses the simplification identities to simplify the query.

Referring first to FIG. 5A, block 502 represents the acceptance of input into the routine, i.e., from block 406 in FIG. 4. The input comprises a root of an expression (sub)tree T containing unary operators {δ,π,σ} and binary operators { ⋈, →, ←, ⇆, $\cap_d$, $\cap_a$ }. In the expression sub(tree), it is assumed that all selections have been pushed down as close to the base relations as possible. Further, it is assumed that the query has undergone query simplification to convert unnecessary outer joins to joins, etc., as described in [BHAR94], which is incorporated by reference herein.

Let $\odot_r$ be the root of T. The inference propagation method does a post-order traversal of the tree as described in the following steps.

Block 504 is a decision block that determines whether $\odot_r$ is a leaf (i.e., a base relation) of the expression tree. If so, then control is transferred to block 506, which sets strongSet (T) to an empty set, and then to block 508, which terminates the routine and returns control to the calling routine. Otherwise control is transferred to block 510.

Block 510 is a decision block that determines whether $\odot_r=\sigma_p$ and its child $\odot_c$ is a base relation s=(R,V,E). If so, then control is transferred to block 512, which stores attribute A in strongSet(T) if A is in sch(p) and p strongly binds A, and then to block 508, which terminates the routine and returns control to the calling routine. Otherwise, control is transferred to block 514.

Block 514 is a decision block that determines whether $\odot_r \in \{\delta_X, \pi_X\}$, wherein $\odot_c$ is its child. If so, then control is transferred to block 516, which stores strongSet($\odot_c$)∩X into strongSet(T), and then to block 508, which terminates the routine and returns control to the calling routine. Otherwise, control is transferred to FIG. 5B via "A".

Figure 5B:
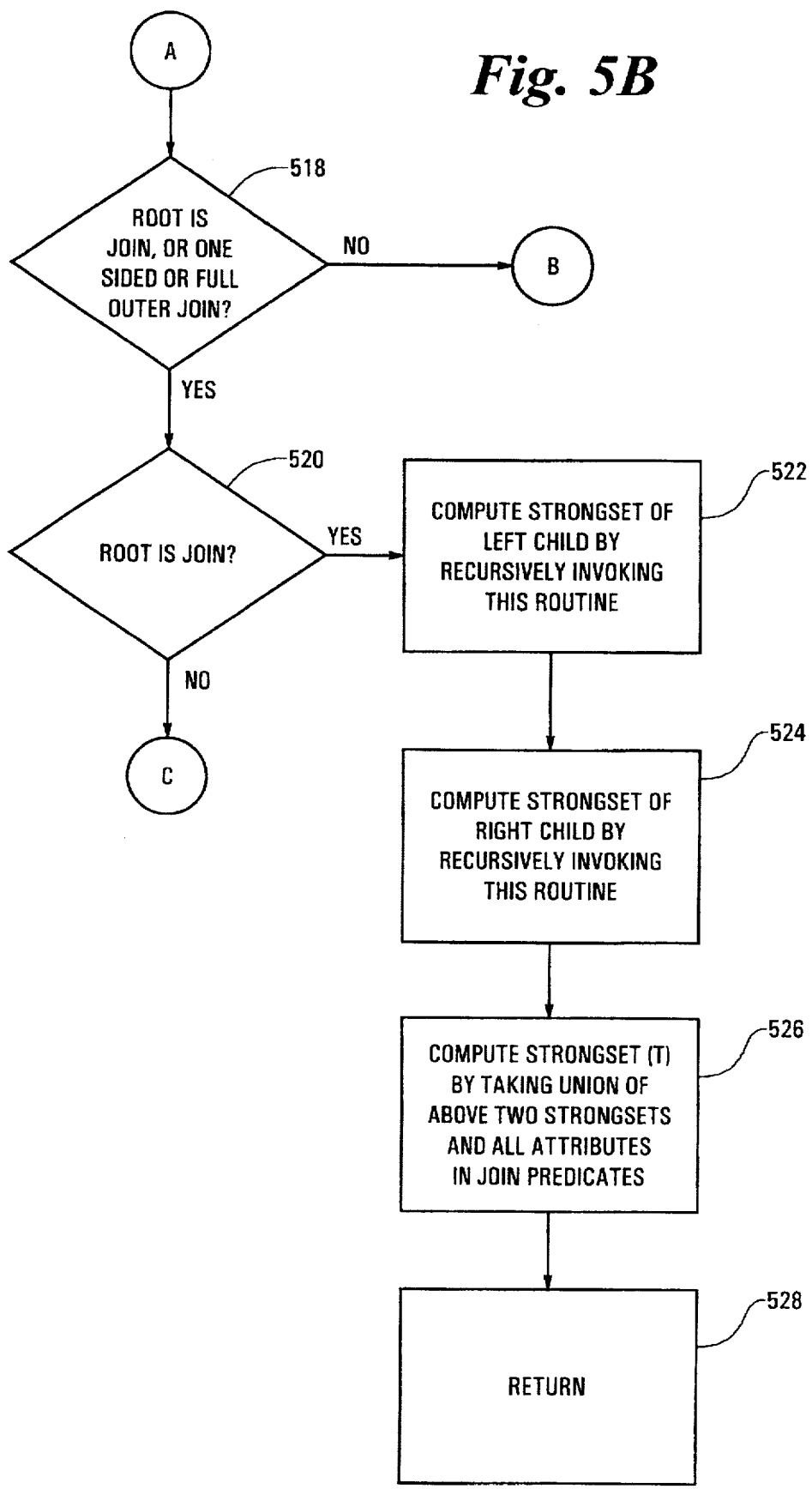

Referring now to FIG. 5B, block 518 is a decision block that determines whether $$p_{LR}$$
$$\odot_r$$

is a binary operator ∈{ ⋈, →, ←→ }, wherein $\odot_L$ and $\odot_R$ are its left and right children, respectively. If not then control is transferred to FIG. 5F via "B"; otherwise, control is transferred to block 520.

Block 520 is a decision block that determines whether $\odot_r = ⋈$. If not, then control is transferred FIG. 5C via "C". Otherwise, control is transferred to block 522.

Block 522 computes the strongSet($\odot_L$) by recursively invoking this inference propagation routine for the left child $\odot_L$. Block 524 computes the strongSet($\odot_R$) by recursively invoking this inference propagation routine for the right child $\odot_R$. Block 526 computes the strongSet(T) by taking the union of the above two strongSets and all attributes in the join predicates, i.e., by storing strongSet($\odot_L$) ∪ strongset ($\odot_R$) ∪ (all attributes mentioned in $p_{LR}$) into strongSet(T). Block 528 terminates the routine and returns control to the calling routine.

Figure 5C:
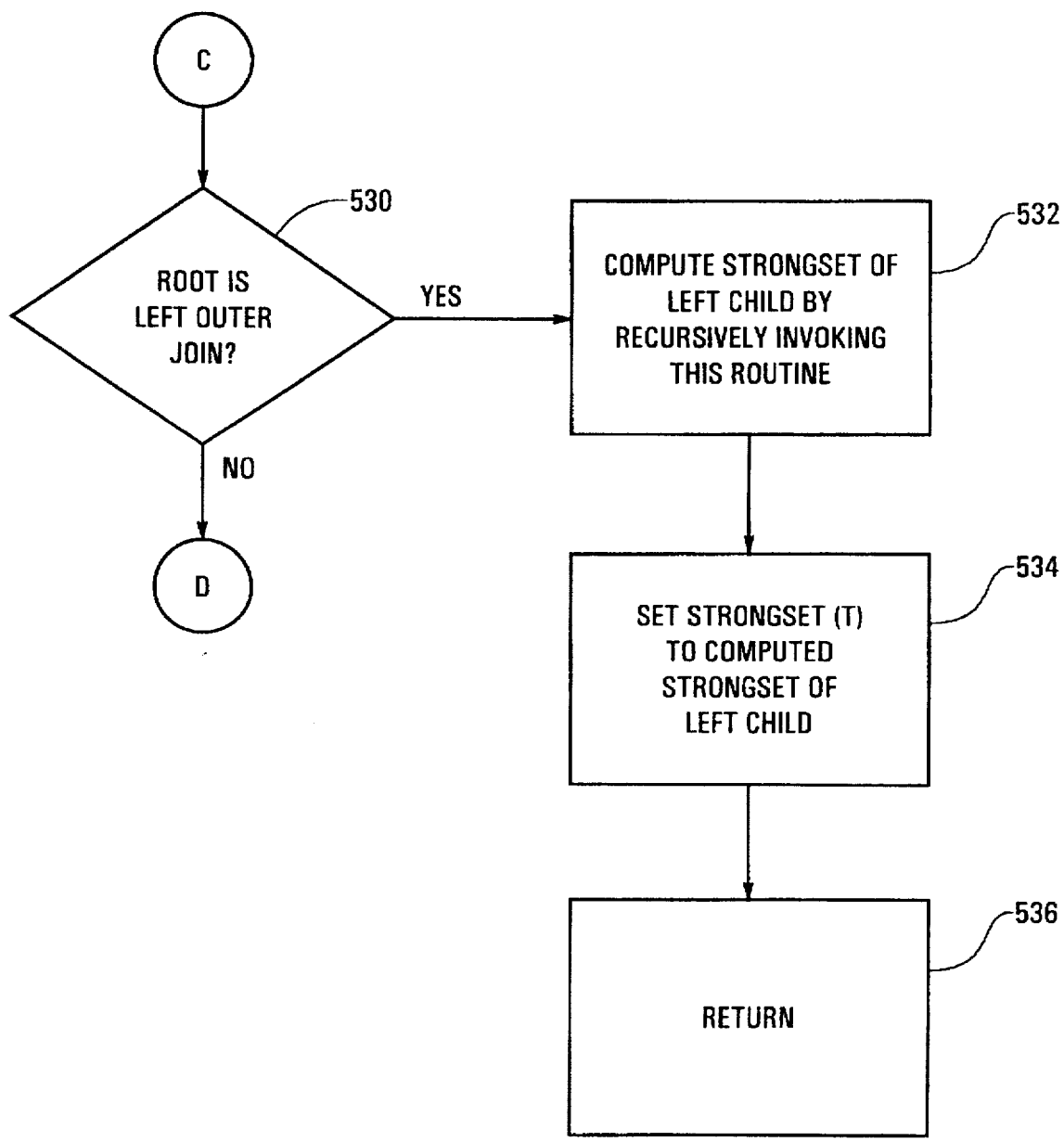

Referring now to FIG. 5C, block 530 is a decision block that determines whether $\odot_r = →$. If not, then control is transferred to FIG. 5D via "D". Otherwise, control is transferred to block 532.

Block 532 computes the strongSet($\odot_L$) by recursively invoking this inference propgation routine. Block 534 stores strongSet($\odot_L$) into strongSet(T). Block 536 terminates the routine and returns control to the calling routine.

Figure 5D:
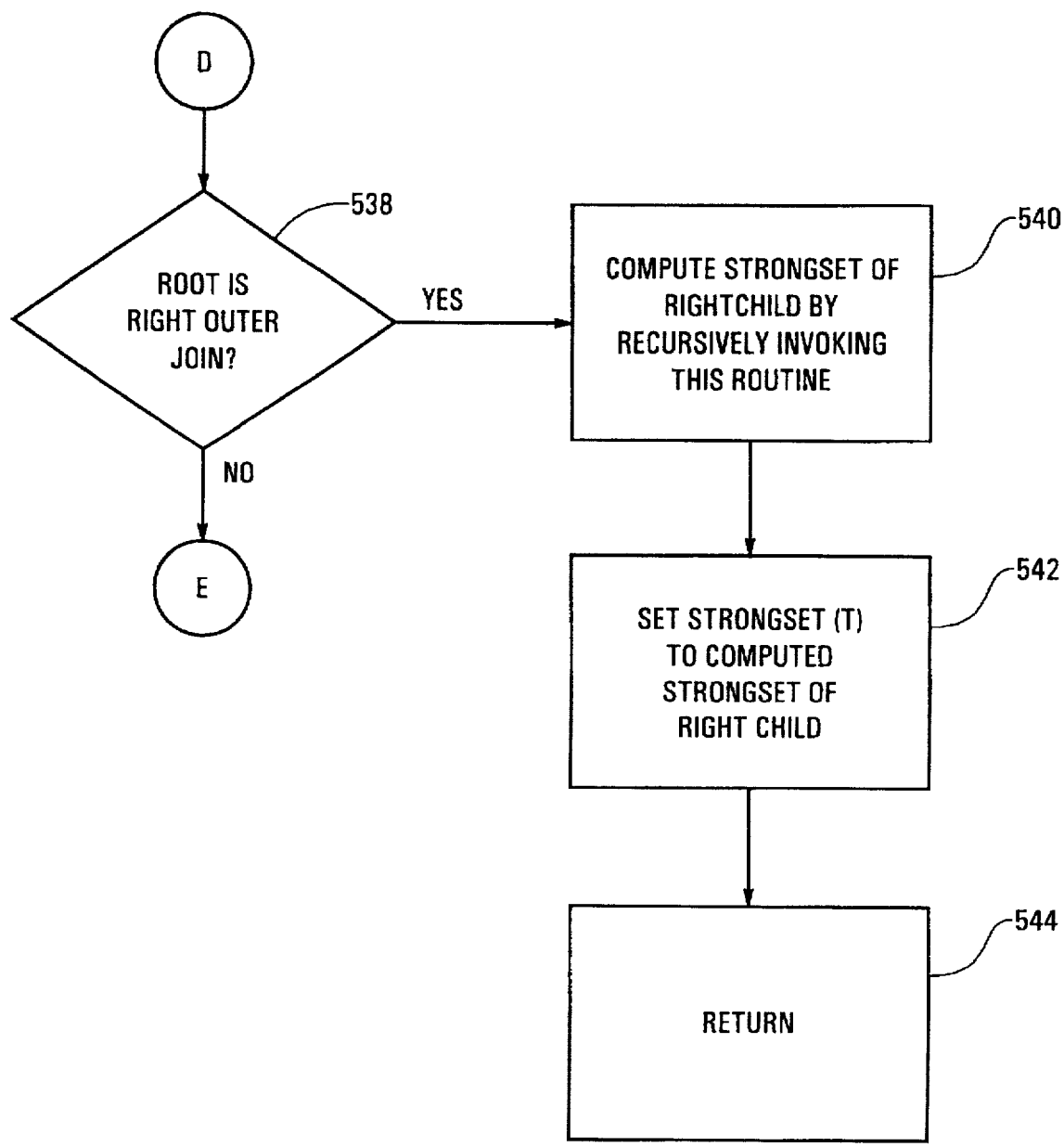

Referring now to FIG. 5D, block 538 is a decision block that determines whether $\odot_r = ←$. If not, then control is transferred to FIG. 5E via "E". Otherwise, control is transferred to block 540.

Block 540 computes the strongSet($\odot_R$) by recursively invoking this inference propgation routine. Block 542 stores strongSet($\odot_R$) into strongSet(T). Block 544 terminates the routine and returns control to the calling routine.

Figure 5E:
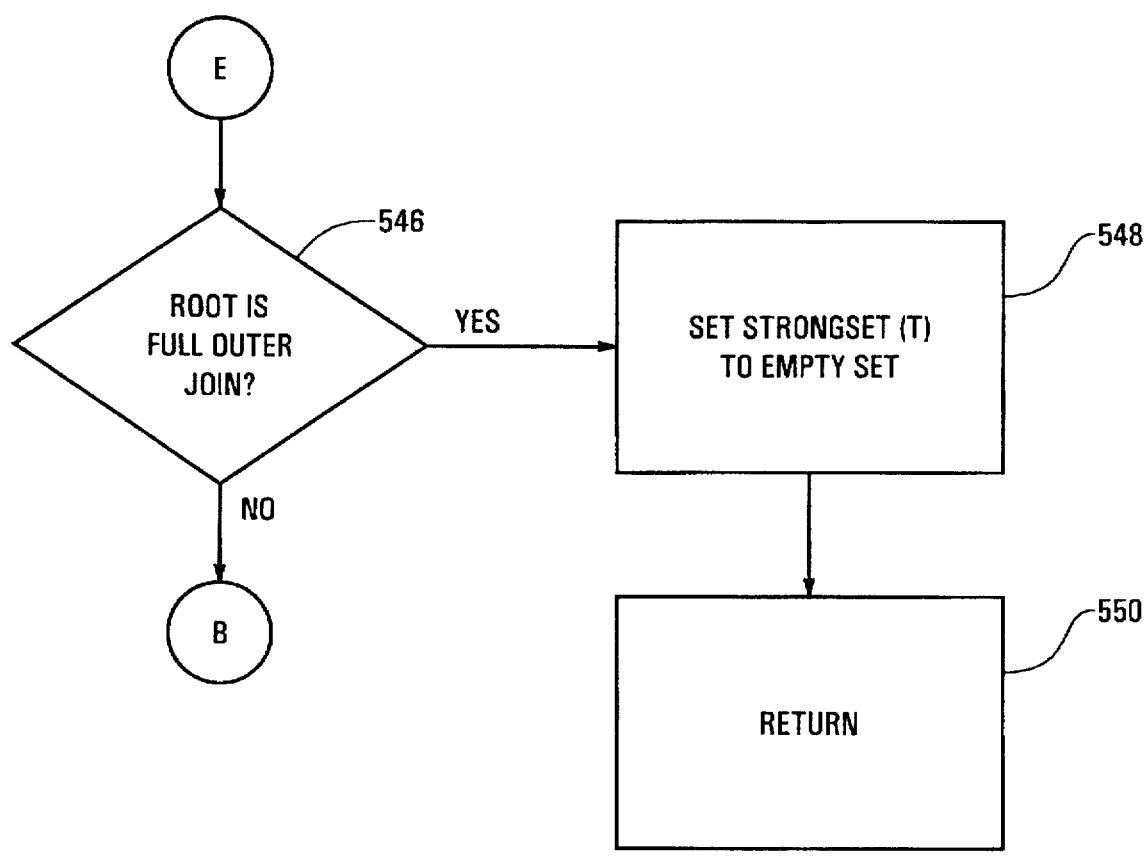

Referring now to FIG. 5E, block 546 is a decision block that determines whether $\odot_r = ⇆$. If not, then control is transferred to FIG. 5F via "B". Otherwise, control is transferred to block 548.

Block 548 sets strongSet(T) to an empty set. Block 550 terminates the routine and returns control to the calling routine.

Figure 5F:
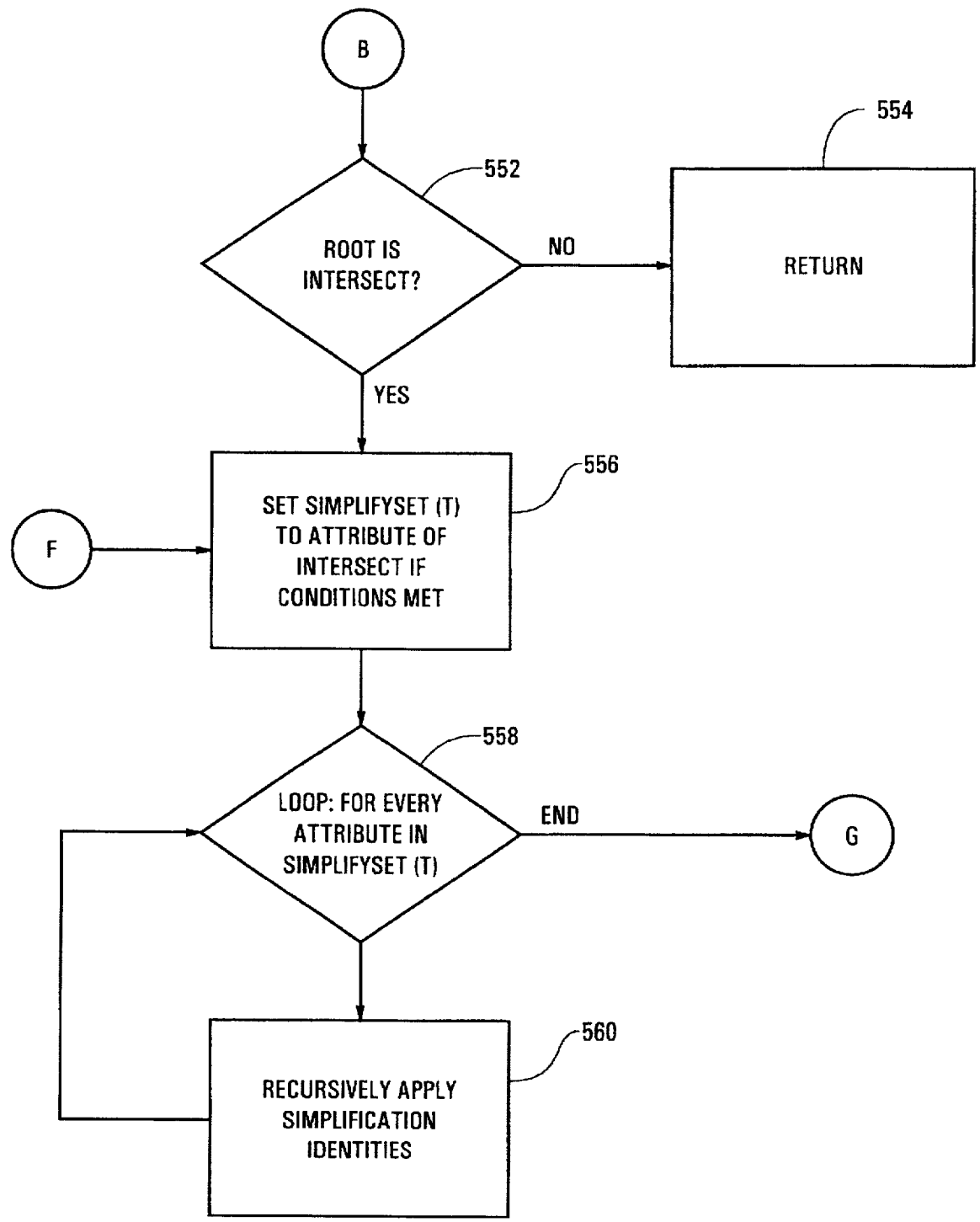

Referring now to FIG. 5F, block 552 is a decision block that determines whether $\odot_r \in \{\cap_d, \cap_a\}$, wherein $\odot_L$ and $\odot_R$ are its left and right children, respectively. If not, then control is transferred to block 554, which terminates the inference propagation and returns to the calling routine. Otherwise, control is transferred to block 556.

Block 556 stores attribute A into simplifySet(T) if A ∈ strongSet($\odot_L$) and Compat(A) ∉ strongSet($\odot_R$), or if A ∈ strongSet($\odot_L$) and Compat(A) ∉ strongSet ($\odot_R$). Thus, simplifySet(T) is a set of those attributes that are strong or strongly bound in exactly one of the two operands of the intersect operator.

Block 558 is a sequential "for" loop that is executed once for every attribute A ∈ simplifySet(T). Block 558 transfers control to block 560 as the first step of the loop for each attribute. Otherwise, control transfers to FIG. 5G via "G" after all attributes A ∈ simplifySet(T) have been processed in the loop.

Block 560 recursively applies the simplification identities (1)–(9) to the expression (sub)tree with predicate p* join-reduced in attributes A and Compat(A), as described in more detail below. The simplification identities are applied to the tree to transform it into a modified tree, the identities are then re-applied to the modified tree, and the process continues until none of the simplification identities can be applied to the tree. Control is then returned to block 558 to complete the loop.

Figure 5G:
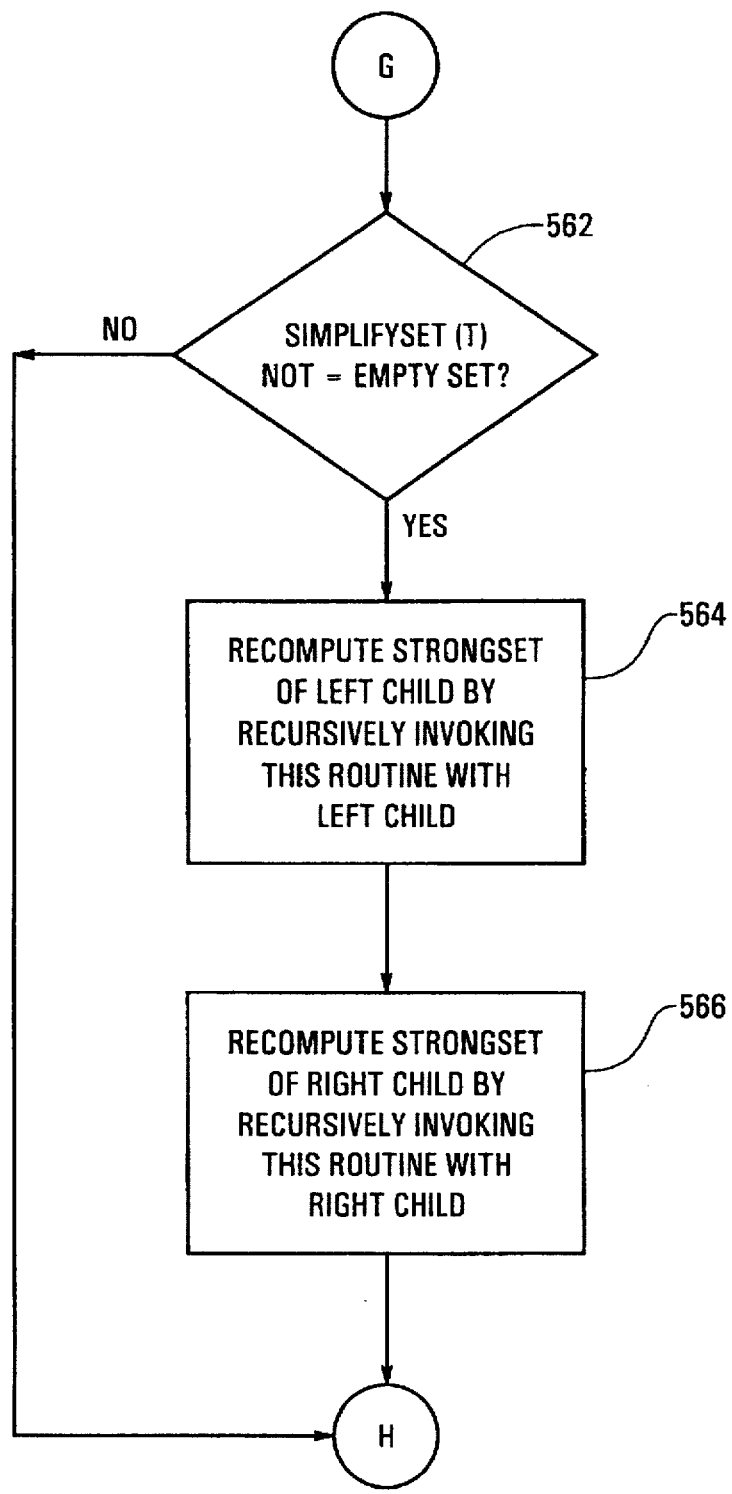

Referring now to FIG. 5G, block 562 is a decision block that determines whether simplifySet(T)≠∅. If not, then control is transferred to FIG. 5H via "H". Otherwise, control is transferred to block 564.

Block 564 recomputes strongSet ($\odot_L$) by recursively invoking this inference propagation routine with ($\odot_L$) as its input. Block 566 recomputes strongSet($\odot_R$) by recursively invoking this inference propagation routine with ($\odot_R$) as its input.

Figure 5H:
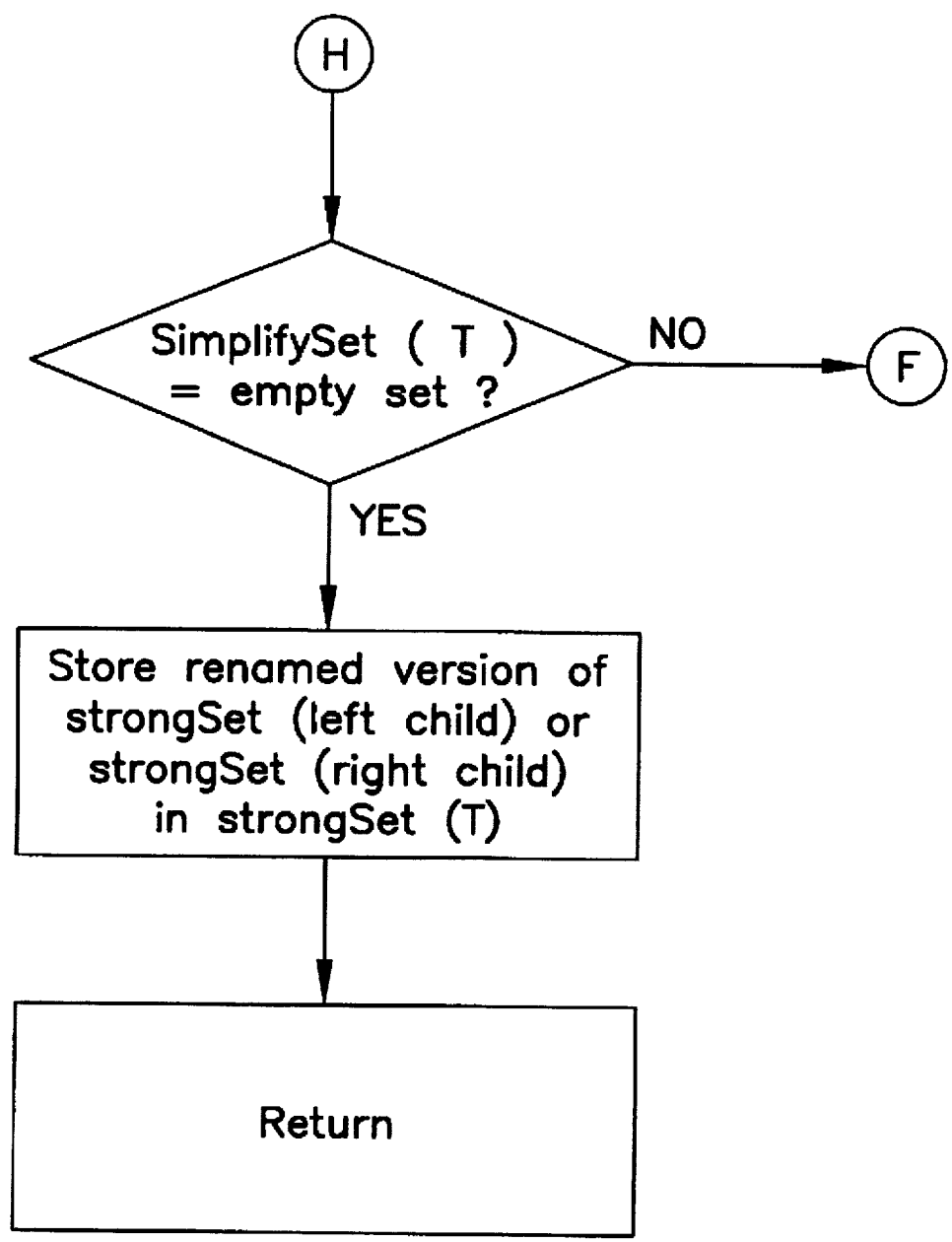

Referring now to FIG. 5H, block 568 is a decision block that determines whether simplifySet(T)=∅. If not, then control is transferred to FIG. 5F via "F" to repeat the above steps. Otherwise, control is transferred to block 570.

Block 570 stores the renamed version of strongSet($\odot_L$) or strongSet($\odot_R$) into strongSet(T), where the renaming is done to correspond to the attribute names in the result of $\cap_d$ or $\cap_a$. Finally, block 572 terminates the routine and returns control to the calling routine.

Notes On Inference Propagation

The step of the inference propagation method that handles $\{\cap_d, \cap_a\}$ operators, computes, in some sense, a "fixed point" solution of the strong set. The number of iterations in this fixed point solution are bounded by the number of arrows (counting a one sided outer joins as one arrow, and full outer join as two arrows) in the (sub) tree rooted at the intersection operator. Since this is a finite number, it also provides proof that the method steps will eventually terminate.

In one possible embodiment of the present invention, the execution of the inference propagation method could be made more efficient. For example, every time strongSet($\odot_L$) or strongSet($\odot_R$) is re-computed, the computation can be restricted to the paths that are affected by the previous simplification, instead of performing a complete traversal of the subtree. This could, for example, be accomplished by keeping a list of paths from the intersection operator to the leaf that contains the outer join operations that are candidates for simplification.

Example of Inference Propagation

Following is an example of inference propagation. Consider the following query involving relations A, B, C, D, E, F, and G having attributes $A_1 A_2 A_3 A_4 A_5$, $B_1$, $C_1$, $D_1$, $E_1$, $F_1 F_2$, and $G_1$, respectively, where the union-compatible attribute pairings are $A_1 C_1$, $A_2 D_1$, $A_3 E_1$, $A_4 F_1$, $A_5 F_2$, $B_1 G_1$, $C_1 F_1$, $D_1 F_2$, and $E_1 G_1$:

$$\left( A \underset{\bowtie}{\overset{A_3=B_1}{}} B \right) \cap_a \left( \left( \left( C \underset{\rightarrow}{\overset{C_1=D_1}{}} D \right) \underset{\rightarrow}{\overset{C_1=E_1}{}} E \right) \cap_a \left( F \underset{\leftarrow}{\overset{F_2=G_1}{}} G \right) \right)$$

Then, an application of inference propagation would determine the following, incrementally.

Since $A_3$ and $B_1$ are strong and $A_3 E_1$ is a union-compatible pair, $\cap_a$ would cause:

$$C_1 = E_1 \\ \rightarrow$$

to become:

$$C_1 = E_1 \\ \bowtie$$

Since $C_1$ is now strong and $C_1 F_1$ is a union-compatible pair, $\cap_a$ would cause:

$$F_2 = G_1 \\ \leftarrow$$

to become:

$$F_2 = G_1 \\ \bowtie$$

Since $F_2$ is now strong and $D_1 F_2$ is a union-compatible pair, $\cap_a$ would cause:

$$C_1 = D_1 \\ \rightarrow$$

to become:

$$C_1 = D_1 \\ \bowtie$$

As a result, the query simplifies to:

$$\left( A \underset{\bowtie}{\overset{A_3=B_1}{}} B \right) \cap_a \left( \left( \left( C \underset{\bowtie}{\overset{C_1=D_1}{}} D \right) \underset{\bowtie}{\overset{C_1=E_1}{}} E \right) \cap_a \left( F \underset{\bowtie}{\overset{F_2=G_1}{}} G \right) \right)$$

SIMPLIFICATION IDENTITIES

Following are the simplification identities applied at block 542 for query expressions involving joins, outer joins, full outer joins, and intersection operators.

Let $X_i = (R_i, V_i, E_i)$, where $1 \leq i \leq 4$, be relational expressions, p be a null-intolerant predicate, and $\cap \in \{\cap_a, \cap_d\}$. Then, the following simplification identities can be used, if the associated criteria are met.

Simplification Identity (1)

$$X_1 \underset{\bowtie}{\overset{P}{}} ((X_2 \rightarrow X_3) \cap X_4) = X_1 \underset{\bowtie}{\overset{P}{}} ((X_2 \bowtie X_3) \cap X_4)$$

where sch(p) $\cap R_3 \neq \emptyset$.

Simplification Identity (2)

$$X_1 \underset{\bowtie}{\overset{P}{}} ((X_2 \leftarrow X_3) \cap X_4) = X_1 \underset{\bowtie}{\overset{P}{}} ((X_2 \rightarrow X_3) \cap X_4)$$

where sch(p) $\cap R_2 \neq \emptyset$.

Simplification Identity (3)

$$X_1 \underset{\bowtie}{\overset{P}{}} ((X_2 \leftarrow X_3) \cap X_4) = X_1 \underset{\bowtie}{\overset{P}{}} ((X_2 \bowtie X_3) \cap X_4)$$

where sch(p)$\cap R_2 \neq \emptyset$ and sch(p)$\cap R_3 \neq \emptyset$.

Simplification Identity (4)

$$X_1 \underset{\rightarrow}{\overset{P}{}} ((X_2 \rightarrow X_3) \cap X_4) = X_1 \underset{\rightarrow}{\overset{P}{}} ((X_2 \bowtie X_3) \cap X_4)$$

where sch(p)$\cap R_3 \neq \emptyset$.

Simplification Identity (5)

$$X_1 \underset{\rightarrow}{P} ((X_2 - X_3) \cap X_4) = X_1 \underset{\rightarrow}{P} ((X_2 \rightarrow X_3) \cap X_4)$$

where $sch(p) \cap R_3 \neq \emptyset$.

Simplification Identity (6)

$$X_1 \underset{\rightarrow}{P} ((X_2 - X_3) \cap X_4) = X_1 \underset{\rightarrow}{P} ((X_2 \bowtie X_3) \cap X_4)$$

where $sch(p) \cap R_2 \neq \emptyset$ and $sch(p) \cap R_3 \neq \emptyset$.

Corresponding Simplification Identities

Corresponding identities which simplify the right operand of the intersection operator are also used. All of these identities are applied recursively.

Additional Simplification Identities

The intersection operator has two union-compatible operands. Without loss of generality, let the schemas of the two operands be $L_1 L_2 \ldots L_n$ and $R_1 R_2 \ldots R_n$, where each of the $L_i R_i$ pairs are union compatible, $1 \leq i \leq n$. The definition of intersection distinct can be re-stated as:

$$r_1 \cap_d r_2 = \{t_1 \in r_1 | (\exists t_2 \in r_2)(\forall i) \ (1 \leq i \leq n \rightarrow p^*_{L_i R_i} \ is \ TRUE)\}$$

where $P^*_{L_i R_i}$ is the predicate:

$$(t_1[L_i] \text{ is not NULL } \wedge t_2[R_i] \text{ is not NULL } \wedge t_1[L_i] = t_2[R_i]) \vee (t_1[L_i] \text{ is NULL } \wedge t_2[R_i] \text{ is NULL})$$

Or, equivalently:

$$r_1 \cap_d r_2 = \{t_2 \in r_2 | (\exists t_1 \in r_1)(\forall i)(1 \leq i \leq n \rightarrow p^*_{L_i R_i} \ is \ TRUE)\}$$

Also, $p^*_{L_i R_i} = \wedge p^*_{L_i R_i}$ for $1 \leq i \leq n$.

In this context, the operator "=" is used for non-NULL values, along with the predicates "is NULL" and "is not NULL".

For $\cap_a$, the same predicate condition determines which tuples are included in the output, although duplicate tuples are permitted in the result, subject to the "minimum rule".

In the definition of $p^*_{L_i R_i}$, if it can be determined that either $L_i$ or $R_i$, or both, are guaranteed to have non-null values, then the predicate reduces to:

$$t_1[L_i] = t_2[R_i]$$

Such a predicate is termed "join-reduced" in attributes $L_i$ and $R_i$. For such join-reduced predicates, the following novel simplification identities can be applied.

Let $X_i = (R_i, V_i, E_i)$, where $1 \leq i \leq 3$, be relational expressions, $\cap \in \{\cap_a, \cap_d\}$, and let $p^*$ be a join-reduced predicate. Then, the following simplification identities can be used, if the associated criteria are met.

Simplification Identity (7)

$$X_1 \underset{\cap}{p^*} (X_2 \rightarrow X_3) = X_1 \underset{\cap}{p^*} (X_2 \bowtie X_3)$$

if $p^*$ is join-reduced in an attribute in $R_3$.

Simplification Identity (8)

$$X_1 \underset{\cap}{p^*} (X_2 - X_3) = X_1 \underset{\cap}{p^*} (X_2 \rightarrow X_3)$$

if $p^*$ is join-reduced in an attribute in $R_3$.

Simplification Identity (9)

$$X_1 \underset{\cap}{p^*} (X_2 - X_3) = X_1 \underset{\cap}{p^*} (X_2 \bowtie X_3)$$

if $p^*$ is join-reduced in an attribute in $R_2$ and $R_3$.

Corresponding Simplification Identities

Corresponding identities which simplify the left operand of the intersection operator are also used. All these identities are applied recursively.

GENERALIZED TRANSITIVE CLOSURE

The following identities are applied at block 408 of FIG. 4 and constitute a pushup and pushdown rules. The first one of these is a known result for equi-join predicates; the present invention applies to predicates in general. A recursive application of these identities at block 408 of FIG. 4 results in generalized transitive closure.

Let $X = (R_X, V_X, E_X)$, $Y = (R_Y, V_Y, E_Y)$, and $Z = (R_Z, V_Z, E_Z)$ be relational expressions, $P_X$ be a selection predicate on X, $P_Y$ be a selection predicate on Y, and $J_{XY}$ be a null-intolerant join/outer join predicate. Then, the following generalized transitive closure identities can be used, if the associated criteria are met.

Generalized Transitive Closure Identity (1)

$$\sigma_{p_X}\left( X \underset{\bowtie}{J_{XY}} Y \right) \rightarrow \sigma_{p_X}(X) \underset{\bowtie}{J_{XY}} \sigma_{p_Y}(Y)$$

if $p_X \wedge J_{XY} \rightarrow p_Y$. In the above if $J_{XY}$ is an equi-join predicate, then the implication can be replaced by equivalence.

Generalized Transitive Closure Identity (2)

$$\sigma_{p_X}\left( X \underset{\rightarrow}{J_{XY}} Y \right) \rightarrow \sigma_{p_X}(X) \underset{\rightarrow}{J_{XY}} \sigma_{p_Y}(Y)$$

if $p_X \wedge J_{XY} \rightarrow p_Y$. In the above, if $J_{XY}$ is an equi-join predicate, then the implication can be replaced by equivalence.

Generalized Transitive Closure Identity (3)

$$\sigma_{p_X}(X) \underset{\rightarrow}{J_{XY}} Y \rightarrow \sigma_{p_X}(X) \underset{\rightarrow}{J_{XY}} \sigma_{p_Y}(Y)$$

if $p_X \wedge J_{XY} \rightarrow p_Y$. In the above, if $J_{XY}$ is an equi-join predicate, then the implication can be replaced by equivalence.

Generalized Transitive Closure Identity (4)

$$\sigma_{p_Y}\left( X \underset{\rightarrow}{J_{XY}} Y \right) = \sigma_{p_Y}\left( X \underset{\bowtie}{J_{XY}} Y \right) \ldots$$

(from [GALI92b]). Further:

$$\sigma_{p_Y}\left( X \underset{\bowtie}{J_{XY}} Y \right) \rightarrow \sigma_{p_X}(X) \underset{\bowtie}{J_{XY}} \sigma_{p_Y}(Y)$$

if $p_Y \wedge J_{XY} \rightarrow p_X$.

Generalized Transitive Closure Identity (5)

Let p be a predicate on the output attributes of an intersection operation ($\cap_d, \cap_a$), and let $p_X$ and $p_Y$ be obtained from p by renaming the attributes referenced in p to the corresponding attributes in the operands X and Y, respectively. Then:

$$\sigma_p(X \cap Y) = \sigma_{p_X}(X) \cap \sigma_{p_Y}(Y)$$

for $\cap \in \{\cap_d, \cap_a\}$, and:

$\sigma_{px}(X) \cap Y = \sigma_p(X \cap Y)$ for $\cap \in \{\cap_d, \cap_a\}$.

Generalized Transitive Closure Identity (6)

$$\left(\ldots \left(X \underset{\bowtie}{\overset{J_{XY}}{}} Y\right) \ldots\right) \cap Z = \left(\ldots \left(X \underset{\bowtie}{\overset{J_{XY}}{}} Y\right) \ldots\right) \cap \sigma_p(Z)$$

where p is obtained by replacing each of the attributes in $J_{XY}$ by their corresponding union-compatible attributes from Z, and $\cap \in (\cap_d, \cap_a)$. If any of the attributes in $J_{XY}$ are not part of the schema of the expression:

$$\left(\ldots \left(X \underset{\bowtie}{\overset{J_{XY}}{}} Y\right) \ldots\right)$$

(e.g., removed through projection), then there is no corresponding union-compatible attributes from Z, and the transformation does not apply.

Additionally, using the identities for σ-pushdown described herein, the expression $\sigma_p(Z)$ could be simplified further. This transformation would be applied after the inference propagation method has been used to simplify the query.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the SQL language could benefit from the present invention.

In summary, the present invention discloses a method and apparatus for query simplification using generalized inference propagation and generalized transitive closure in SQL queries having selection, projection, join, outer join, and intersection operations.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of simplifying an SQL query in a computer having a memory, the SQL query being performed by the computer to retrieve data from a relational database stored in a electronic storage device coupled to the computer, the method comprising the steps of:

(a) iteratively calculating, in the memory of the computer, a strong set of attributes referenced in the query; and (b) iteratively replacing, in the memory of the computer, full, left, and right outer join operations found in one or more operands of an intersection operation in the query with outer and inner join operations using the strong set of attributes until no more simplification is possible.

2. The method as set forth in claim 1 above, wherein an attribute A is a member of the strong set of attributes when all tuples defined on schemas containing A have non-null values for attribute A.

3. The method as set forth in claim 1 above, wherein an attribute A is a member of the strong set of attributes when the attribute A is referenced through null-intolerant selection and join predicates.

4. The method as set forth in claim 1 above, wherein an attribute A is a member of the strong set of attributes when all tuples defined on schemas containing A have exactly the same non-null value for attribute A.

5. The method as set forth in claim 1 above, wherein an attribute A is a member of the strong set of attributes when a selection operator referencing the attribute A assigns a constant value to the attribute A.

6. The method as set forth in claim 1 above, wherein the iteratively replacing step comprises the step of replacing a first expression in the query with a second expression, wherein the first expression comprises:

$$X_1 \underset{\bowtie}{\overset{P}{}} ((X_2 \to X_3) \cap X_4)$$

and the second expression comprises:

$$X_1 \underset{\bowtie}{\overset{P}{}} ((X_2 \bowtie X_3) \cap X_4)$$

wherein $X_i = (R_i, V_i, E_i)$ are relational expressions for $1 \leq i \leq 4$, p is a null-intolerant predicate, $sch(p) \cap R_3 \neq \emptyset$, $\bowtie$ is a join operator, $\to$ is a left outer join operator, $\cap_a$ is an intersect all operator, $\cap_d$ is an intersect distinct operator, and $\cap \in \{\cap_a, \cap_d\}$.

7. The method as set forth in claim 1 above, wherein the iteratively replacing step comprises the step of replacing a first expression in the query with a second expression, wherein the first expression comprises:

$$X_1 \underset{\bowtie}{\overset{P}{}} ((X_2 \leftrightharpoons X_3) \cap X_4)$$

and the second expression comprises:

$$X_1 \underset{\bowtie}{\overset{P}{}} ((X_2 \to X_3) \cap X_4)$$

wherein $X_i = (R_i, V_i, E_i)$ are relational expressions for $1 \leq i \leq 4$, p is a null-intolerant predicate, $sch(p) \cap R_2 \neq \emptyset$, $\to$ is a left outer join operator, $\leftrightharpoons$ is a full outer join operator, $\cap_a$ is an intersect all operator, $\cap_d$ is an intersect distinct operator, and $\cap \in \{\cap_a, \cap_d\}$.

8. The method as set forth in claim 1 above, wherein the iteratively replacing step comprises the step of replacing a first expression in the query with a second expression, wherein the first expression comprises:

$$X_1 \underset{\bowtie}{\overset{P}{}} ((X_2 \leftrightharpoons X_3) \cap X_4)$$

and the second expression comprises:

$$X_1 \underset{\bowtie}{\overset{P}{}} ((X_2 \bowtie X_3) \cap X_4)$$

wherein $X_i = (R_i, V_i, E_i)$ are relational expressions for $1 \leq i \leq 4$, p is a null-intolerant predicate, $sch(p) \cap R_2 \neq \emptyset$, $sch(p) \cap R_3 \neq \emptyset$, $\bowtie$ is a join operator, $\leftrightharpoons$ is a full outer join operator, $\cap_a$ is an intersect all operator, $\cap_d$ is an intersect distinct operator, and $\cap \in \{\cap_a, \cap_d\}$.

9. The method as set forth in claim 1 above, wherein the iteratively replacing step comprises the step of replacing a first expression in the query with a second expression, wherein the first expression comprises:

$$X_1 \xrightarrow{P} ((X_2 \to X_3) \cap X_4)$$

and the second expression comprises:

$$X_1 \xrightarrow{P} ((X_2 \bowtie X_3) \cap X_4)$$

wherein $X_i=(R_i, V_i, E_i)$ are relational expressions for $1 \leq i \leq 4$, p is a null-intolerant predicate, $sch(p) \cap R_3 \neq \emptyset$, $\bowtie$ is a join operator, $\to$ is a left outer join operator, $\cap_a$ is an intersect all operator, $\cap_d$ is an intersect distinct operator, and $\cap \in \{\cap_a, \cap_d\}$.

10. The method as set forth in claim 1 above, wherein the iteratively replacing step comprises the step of replacing a first expression in the query with a second expression, wherein the first expression comprises:

$$X_1 \xrightarrow{P} ((X_2 \leftrightarrow X_3) \cap X_4)$$

and the second expression comprises:

$$X_1 \xrightarrow{P} ((X_2 \to X_3) \cap X_4)$$

wherein $X_i=(R_i, V_i, E_i)$ are relational expressions for $1 \leq i \leq 4$, p is a null-intolerant predicate, $sch(p) \cap R_3 \neq \emptyset$, $\to$ is a left outer join operator, $\leftrightarrow$ is a full outer join operator, $\cap_a$ is an intersect all operator, $\cap_d$ is an intersect distinct operator, and $\cap \in \{\cap_a, \cap_d\}$.

11. The method as set forth in claim 1 above, wherein the iteratively replacing step comprises the step of replacing a first expression in the query with a second expression, wherein the first expression comprises:

$$X_1 \xrightarrow{P} ((X_2 \leftrightarrow X_3) \cap X_4)$$

and the second expression comprises:

$$X_1 \xrightarrow{P} ((X_2 \bowtie X_3) \cap X_4)$$

wherein $X_i=(R_i, V_i, E_i)$ are relational expressions for $1 \leq i \leq 4$, p is a null-intolerant predicate, $sch(p) \cap R_2 \neq \emptyset$, $sch(p) \cap R_3 \neq \emptyset$, $\bowtie$ is a join operator, $\to$ is a left outer join operator, $\leftrightarrow$ is a full outer join operator, $\cap_a$ is an intersect all operator, $\cap_d$ is an intersect distinct operator, and $\cap \in \{\cap_a, \cap_d\}$.

12. The method as set forth in claim 1 above, wherein the iteratively replacing step comprises the step of replacing a first expression in the query with a second expression, wherein the first expression comprises:

$$X_1 \xrightarrow[\cap]{P^*} (X_2 \to X_3)$$

and the second expression comprises:

$$X_1 \xrightarrow[\cap]{P^*} (X_2 \bowtie X_3)$$

wherein $X_i=(R_i, V_i, E_i)$ are relational expressions for $1 \leq i \leq 4$, p* is a join reduced predicate in an attribute in $R_3$, $\bowtie$ is a join operator, $\to$ is a left outer join operator, $\cap_a$ is an intersect all operator, $\cap_d$ is an intersect distinct operator, and $\cap \in \{\cap_a, \cap_d\}$.

13. The method as set forth in claim 1 above, wherein the iteratively replacing step comprises the step of replacing a first expression in the query with a second expression, wherein the first expression comprises:

$$X_1 \xrightarrow[\cap]{P^*} (X_2 \leftrightarrow X_3)$$

and the second expression comprises:

$$X_1 \xrightarrow[\cap]{P^*} (X_2 \to X_3)$$

wherein $X_i=(R_i, V_i, E_i)$ are relational expressions for $1 \leq i \leq 4$, p* is a join reduced predicate in an attribute in $R_2$, $\to$ is a left outer join operator, $\leftrightarrow$ is a full outer join operator, $\cap_a$ is an intersect all operator, $\cap_d$ is an intersect distinct operator, and $\cap \in \{\cap_a, \cap_d\}$.

14. The method as set forth in claim 1 above, wherein the iteratively replacing step comprises the step of replacing a first expression in the query with a second expression, wherein the first expression comprises:

$$X_1 \xrightarrow[\cap]{P^*} (X_2 \leftrightarrow X_3)$$

and the second expression comprises:

$$X_1 \xrightarrow[\cap]{P^*} (X_2 \bowtie X_3)$$

wherein $X_i=(R_i, V_i, E_i)$ are relational expressions for $1 \leq i \leq 4$, p* is a join reduced predicate in an attribute in $R_2$ and $R_3$, $\bowtie$ is a join operator, $\leftrightarrow$ is a full outer join operator, $\cap_a$ is an intersect all operator, $\cap_d$ is an intersect distinct operator, and $\cap \in \{\cap_a, \cap_d\}$.

15. The method as set forth in claim 1 above, further comprising the steps of:

(1) iteratively calculating a strong set of attributes referenced in a sub-expression of the query; and (2) iteratively replacing full, left, and right outer join operations in the sub-expression with outer and inner join operations using the strong set of attributes for the sub-expression until no more simplification is possible.

16. A method of simplifying an SQL query in a computer having a memory, the SQL query being performed by the computer to retrieve data from a relational database stored in a electronic storage device coupled to the computer, the method comprising the steps of:

(a) generating an expression tree to represent the query in the memory of the computer, the expression tree comprised of a set of leaves corresponding to relations referenced in the query, and a set of inner nodes corresponding to operators occurring in the query;

(b) generating a strong set of attributes for the expression tree in the memory of the computer;

(c) post-order traversing the expression tree in the memory of the computer until a node representing an intersection operator is encountered;

(d) simplifying a subtree of the expression tree below the intersection operator in the memory of the computer;

(e) re-generating the strong set of attributes for the subtree in the memory of the computer; and (f) repeating steps (b)–(d) until the strong set of attributes does not change.

17. The method as set forth in claim 16 above, wherein the strong set of attributes is comprised of one or more attributes A, such that all tuples defined on schemas containing A have non-null values for attribute A.

18. The method as set forth in claim 16 above, wherein the strong set of attributes is comprised of one or more attributes A, wherein the attribute A is referenced through null-intolerant selection and join predicates.

19. The method as set forth in claim 16 above, wherein the strong set of attributes is comprised of one or more attributes A, such that all tuples defined on schemas containing A have exactly the same non-null value for attribute A.

20. The method as set forth in claim 16 above, wherein the strong set of attributes is comprised of one or more attributes A, wherein a selection operator referencing the attribute A assigns a constant value to the attribute A.

21. The method as set forth in claim 16 above, wherein the simplifying step comprises replacing an outer join operation with a join operation.

22. The method as set forth in claim 16 above, wherein the simplifying step comprises replacing a full outer join operation with a one-sided outer join operation.

23. A method of simplifying an SQL query in a computer having a memory, the SQL query being performed by the computer to retrieve data from a relational database stored in a electronic storage device coupled to the computer, the method comprising the steps of:

(a) examining the query in the memory of the computer to identify instances where a selection operator is applied to a result of a sub-expression, wherein the sub-expression comprises a first operator applied to first and second operands;

(b) identifying, in the memory of the computer, classes of attributes for the selection operator and the sub-expression that are equated through the first operator in the sub-expression;

(c) generating, in the memory of the computer, selection predicates from the identified classes; and (d) applying, in the memory of the computer, selection operators to the first and second operands using the generated selection predicates before the first operator is performed, thereby making intermediate results from the first operator smaller.

24. The method of claim 23 above, wherein the first operator is selected from a group comprising: (1) a join operator, (2) a full outer join operator, (3) a one-sided outer join operator, and (4) an intersect operator.

25. The method of claim 23 above, wherein the applying step further comprises the step of replacing:

$$\sigma_{p_X}\left(X \underset{\bowtie}{\overset{J_{XY}}{\rightarrow}} Y\right)$$

with:

$$\sigma_{p_X}(X) \underset{\bowtie}{\overset{J_{XY}}{\rightarrow}} \sigma_{p_X}(Y)$$

when $p_X \wedge J_{XY} \rightarrow p_Y$, wherein $X=(R_X, V_X, E_X)$ and $Y=(R_Y, V_Y, E_Y)$ are relational expressions, $p_X$ is a selection predicate on X, $p_Y$ is a selection predicate on Y, $J_{XY}$ is a null-intolerant join/outer join predicate, $\bowtie$ is a join operator, and $\sigma$ is a selection operator.

26. The method of claim 23 above, wherein the applying step further comprises the step of replacing:

$$\sigma_{p_X}\left(X \overset{J_{XY}}{\rightarrow} Y\right)$$

with:

$$\sigma_{p_X}(X) \overset{J_{XY}}{\rightarrow} \sigma_{p_Y}(Y)$$

when $p_X \wedge J_{XY} \rightarrow p_Y$, wherein $X=(R_X, V_X, E_X)$ and $Y=(R_Y, V_Y, E_Y)$ are relational expressions, $p_X$ is a selection predicate on X, $p_Y$ is a selection predicate on Y, $J_{XY}$ is a null-intolerant join/outer join predicate, $\rightarrow$ is a left outer join operator, and $\sigma$ is a selection operator.

27. The method of claim 23 above, wherein the applying step further comprises the step of replacing:

$$\sigma_{p_X}(X) \overset{J_{XY}}{\rightarrow} Y$$

with:

$$\sigma_{p_X}(X) \overset{J_{XY}}{\rightarrow} \sigma_{p_Y}(Y)$$

when $p_X \wedge J_{XY} \rightarrow p_Y$, wherein $X=(R_X, V_X, E_X)$ and $Y=(R_Y, V_Y, E_Y)$ are relational expressions, $p_X$ is a selection predicate on X, $p_Y$ is a selection predicate on Y, $J_{XY}$ is a null-intolerant join/outer join predicate, $\rightarrow$ is a left outer join operator, and $\sigma$ is a selection operator.

28. The method of claim 23 above, wherein the applying step further comprises the step of replacing:

$$\sigma_{p_Y}\left(X \underset{\bowtie}{\overset{J_{XY}}{\rightarrow}} Y\right)$$

with:

$$\sigma_{p_X}(X) \underset{\bowtie}{\overset{J_{XY}}{\rightarrow}} \sigma_{p_Y}(Y)$$

when $p_Y \wedge J_{XY} \rightarrow p_X$, wherein $X=(R_X, V_X, E_X)$ and $Y=(R_Y, V_Y, E_Y)$ are relational expressions, $p_X$ is a selection predicate on X, $p_Y$ is a selection predicate on Y, $J_{XY}$ is a null-intolerant join/outer join predicate, $\bowtie$ is a join operator, and $\sigma$ is a selection operator.

29. The method of claim 23 above, wherein the applying step further comprises the step of replacing:

$$\sigma_p(X \cap Y)$$

with:

$$\sigma_{p_X}(X) \cap \sigma_{p_Y}(Y)$$

wherein $X=(R_X, V_X, E_X)$ and $Y=(R_Y, V_Y, E_Y)$ are relational expressions, p is a predicate on output attributes of an intersection operation $\cap \in (\cap_d, \cap_a)$, $\cap_a$ is an intersect all operator, $\cap_d$ is an intersect distinct operator, $p_X$ is a selection predicate on operand X, $p_Y$ is a selection predicate on operand Y, $p_X$ and $p_Y$ are obtained from p by renaming attributes referenced in p to corresponding attributes in the operands X and Y, respectively, $\bowtie$ is a join operator, and $\sigma$ is a selection operator.

30. The method of claim 23 above, wherein the applying step further comprises the step of replacing:

$$\sigma_{p_X}(X) \cap Y$$

with:

$$\sigma_p(X \cap Y)$$

wherein $X=(R_X, V_X, E_X)$ and $Y=(R_Y, V_Y, E_Y)$ are relational expressions, p is a predicate on output attributes of an intersection operation $\cap \in (\cap_d, \cap_a)$, $\cap_a$ is an intersect all operator, $\cap_d$ is an intersect distinct operator, $p_X$ is a selection predicate on operand X, $p_Y$ is a selection predicate on operand Y, $p_X$ and $p_Y$ are obtained from p by renaming attributes referenced in p to corresponding attributes in the operands X and Y, respectively, and $\sigma$ is a selection operator.

31. The method of claim 23 above, wherein the applying step further comprises the step of replacing:

$$\left( \ldots \left( X \underset{\bowtie}{\overset{J_{XY}}{}} Y \right) \ldots \right) \cap Z$$

with:

$$\left( \ldots \left( X \underset{\bowtie}{\overset{J_{XY}}{}} Y \right) \ldots \right) \cap \sigma_p Z$$

wherein $X=(R_X, V_X, E_X)$, $Y=(R_Y, V_Y, E_Y)$, and $Z=(R_Z, V_Z, E_Z)$ are relational expressions, p is a predicate on output attributes of an intersection operation $\cap \in (\cap_d, \cap_a)$, $\cap_a$ is an intersect all operator, $\cap_d$ is an intersect distinct operator, p is obtained by replacing each attribute in $J_{XY}$ by their corresponding union-compatible attributes from Z, $\bowtie$ is a join operator, and $\sigma_p$ is a selection operator.

32. An apparatus for simplifying an SQL query, comprising:

(a) a computer having a memory and an electronic storage device coupled thereto, the data storage device storing a relational database;

(b) means, performed by the computer, for accepting the SQL query into the memory of the computer, the SQL query being executed by the computer to retrieve data from a relational database stored in the computer;

(c) means, performed by the computer, for iteratively calculating a strong set of attributes referenced in the query; and (d) means, performed by the computer, for iteratively replacing full, left, and right outer join operations found in one or more operands of an intersection operation in the query with outer and inner join operations using the strong set of attributes until no more simplification is possible.

33. The apparatus as set forth in claim 32 above, wherein an attribute A is a member of the strong set of attributes when all tuples defined on schemas containing A have non-null values for attribute A.

34. The apparatus as set forth in claim 32 above, wherein an attribute A is a member of the strong set of attributes when the attribute A is referenced through null-intolerant selection and join predicates.

35. The apparatus as set forth in claim 32 above, wherein an attribute A is a member of the strong set of attributes when all tuples defined on schemas containing A have exactly the same non-null value for attribute A.

36. The apparatus as set forth in claim 32 above, wherein an attribute A is a member of the strong set of attributes when a selection operator referencing the attribute A assigns a constant value to the attribute A.

37. The apparatus as set forth in claim 32 above, wherein the means for iteratively replacing comprises means for replacing a first expression in the query with a second expression, wherein the first expression comprises:

$$X_1 \underset{\bowtie}{\overset{P}{}} ((X_2 \to X_3) \cap X_4)$$

and the second expression comprises:

$$X_1 \underset{\bowtie}{\overset{P}{}} ((X_2 \bowtie X_3) \cap X_4)$$

wherein $X_i=(R_i, V_i, E_i)$ are relational expressions for $1 \leq i \leq 4$, p is a null-intolerant predicate sch(p)$\cap R_3 \neq \emptyset$, $\bowtie$ is a join operator, $\to$ is a left outer join operator, $\cap_a$ is an intersect all operator, $\cap_d$ is an intersect distinct operator, and $\cap \in \{\cap_a, \cap_d\}$.

38. The apparatus as set forth in claim 32 above, wherein the means for iteratively replacing comprises means for replacing a first expression in the query with a second expression, wherein the first expression comprises:

$$X_1 \underset{\bowtie}{\overset{P}{}} ((X_2 \leftrightarrow X_3) \cap X_4)$$

and the second expression comprises:

$$X_1 \underset{\bowtie}{\overset{P}{}} ((X_2 \to X_3) \cap X_4)$$

wherein $X_i=(R_i, V_i, E_i)$ are relational expressions for $1 \leq i \leq 4$, p is a null-intolerant predicate, sch(p)$\cap R_2 \neq \emptyset$, $\to$ is a left outer join operator, $\leftrightarrow$ is a full outer join operator, $\cap_a$ is an intersect all operator, $\cap_d$ is an intersect distinct operator, and $\cap \in \{\cap_a, \cap_d\}$.

39. The apparatus as set forth in claim 32 above, wherein the means for iteratively replacing comprises means for replacing a first expression in the query with a second expression, wherein the first expression comprises:

$$X_1 \underset{\bowtie}{\overset{P}{}} ((X_2 \leftrightarrow X_3) \cap X_4)$$

and the second expression comprises:

$$X_1 \underset{\bowtie}{\overset{P}{}} ((X_2 \bowtie X_3) \cap X_4)$$

wherein $X_i=(R_i, V_i, E_i)$ are relational expressions for $1 \leq i \leq 4$, p is a null-intolerant predicate, sch(p)$\cap R_2 \neq \emptyset$, sch(p)$\cap R_3 \neq \emptyset$, $\bowtie$ is a join operator, $\leftrightarrow$ is a full outer join operator, $\cap_a$ is an intersect all operator, $\cap_d$ is an intersect distinct operator, and $\cap \in \{\cap_a, \cap_d\}$.

40. The apparatus as set forth in claim 32 above, wherein the means for iteratively replacing comprises means for replacing a first expression in the query with a second expression, wherein the first expression comprises:

$$X_1 \overset{P}{\to} ((X_2 \to X_3) \cap X_4)$$

and the second expression comprises:

$$X_1 \overset{P}{\to} ((X_2 \bowtie X_3) \cap X_4)$$

wherein $X_i=(R_i, V_i, E_i)$ are relational expressions for $1 \leq i \leq 4$, p is a null-intolerant predicate, sch(p)$\cap R_3 \neq \emptyset$, $\bowtie$ is a join operator, $\to$ is a left outer join operator, $\cap_a$ is an intersect all operator, $\cap_d$ is an intersect distinct operator, and $\cap \in \{\cap_a, \cap_d\}$.

41. The apparatus as set forth in claim 32 above, wherein the means for iteratively replacing comprises means for replacing a first expression in the query with a second expression, wherein the first expression comprises:

$$X_1 \underset{\rightarrow}{P} ((X_2 \bowtie X_3) \cap X_4)$$

and the second expression comprises:

$$X_1 \underset{\rightarrow}{P} ((X_2 \rightarrow X_3) \cap X_4)$$

wherein $X_i=(R_i, V_i, E_i)$ are relational expressions for $1 \leq i \leq 4$, p is a null-intolerant predicate, $sch(p) \cap R_3 \neq \emptyset$, $\rightarrow$ is a left outer join operator, $\leftrightarrows$ is a full outer join operator, $\cap_a$ is an intersect all operator, $\cap_d$ is an intersect distinct operator, and $\cap \in \{\cap_a, \cap_d\}$.

42. The apparatus as set forth in claim 32 above, wherein the means for iteratively replacing comprises means for replacing a first expression in the query with a second expression, wherein the first expression comprises:

$$X_1 \underset{\rightarrow}{P} ((X_2 \bowtie X_3) \cap X_4)$$

and the second expression comprises:

$$X_1 \underset{\rightarrow}{P} ((X_2 \bowtie X_3) \cap X_4)$$

wherein $X_i=(R_i, V_i, E_i)$ are relational expressions for $1 \leq i \leq 4$, p is a null-intolerant predicate, $sch(p) \cap R_2 \neq \emptyset$, $sch(p) \cap R_3 \neq \emptyset$, $\bowtie$ is a join operator, $\rightarrow$ is a left outer join operator, $\leftrightarrows$ is a full outer join operator, $\cap_a$ is an intersect all operator, $\cap_d$ is an intersect distinct operator, and $\cap \in \{\cap_a, \cap_d\}$.

43. The apparatus as set forth in claim 32 above, wherein the means for iteratively replacing comprises means for replacing a first expression in the query with a second expression, wherein the first expression comprises:

$$X_1 \underset{\cap}{P^*} (X_2 \rightarrow X_3)$$

and the second expression comprises:

$$X_1 \underset{\cap}{P^*} ((X_2 \bowtie X_3) \cap X_3)$$

wherein $X_i=(R_i, V_i, E_i)$ are relational expressions for $1 \leq i \leq 4$, p* is a join reduced predicate in an attribute in $R_3$, $\bowtie$ is a join operator, $\rightarrow$ is a left outer join operator, $\cap_a$ is an intersect all operator, $\cap_d$ is an intersect distinct operator, and $\cap \in \{\cap_a, \cap_d\}$.

44. The apparatus as set forth in claim 32 above, wherein the means for iteratively replacing comprises means for replacing a first expression in the query with a second expression, wherein the first expression comprises:

$$X_1 \underset{\cap}{P^*} (X_2 \leftrightarrows X_3)$$

and the second expression comprises:

$$X_1 \underset{\cap}{P^*} (X_2 \rightarrow X_3)$$

wherein $X_i=(R_i, V_i, E_i)$ are relational expressions for $1 \leq i \leq 4$, p* is a join reduced predicate in an attribute in $R_2$, $\rightarrow$ is a left outer join operator, $\leftrightarrows$ is a full outer join operator, $\cap_a$ is an intersect all operator, $\cap_d$ is an intersect distinct operator, and $\cap \in \{\cap_a, \cap_d\}$.

45. The apparatus as set forth in claim 32 above, wherein the means for iteratively replacing comprises means for replacing a first expression in the query with a second expression, wherein the first expression comprises:

$$X_1 \underset{\cap}{P^*} (X_2 \leftrightarrows X_3)$$

and the second expression comprises:

$$X_1 \underset{\cap}{P^*} (X_2 \bowtie X_3)$$

wherein $X_i=(R_i, V_i, E_i)$ are relational expressions for $1 \leq i \leq 4$, p* is a join reduced predicate in an attribute in $R_2$ and $R_3$, $\bowtie$ is a join operator, $\leftrightarrows$ is a full outer join operator, $\cap_a$ is an intersect all operator, $\cap_d$ is an intersect distinct operator, and $\cap \in \{\cap_a, \cap_d\}$.

46. An apparatus for simplifying an SQL query, comprising:

(a) a computer having a memory and an electronic storage device coupled thereto, the data storage device storing a relational database;

(b) means, performed by the computer, for accepting the SQL query into the memory of the computer, the SQL query being performed by the computer to retrieve data from a relational database stored in the computer;

(c) means, performed by the computer, for examining the query to identify instances where a selection operator is applied to a result of a sub-expression, wherein the sub-expression comprises a first operator applied to first and second operand tables;

(d) means, performed by the computer, for identifying classes of attributes for the selection operator and the sub-expression that are equated through the first operator in the sub-expression;

(e) means, performed by the computer, for generating selection predicates from the identified classes; and (f) means, performed by the computer, for applying selection operators to the first and second operand tables using the generated selection predicates before the first operator is performed, thereby making intermediate results from the first operator smaller.

47. The apparatus as set forth in claim 32 above, further comprising:

(1) means for iteratively calculating a strong set of attributes referenced in a sub-expression of the query; and (2) means for iteratively replacing full, left, and right outer join operations in the sub-expression with outer and inner join operations using the strong set of attributes for the sub-expression until no more simplification is possible.

48. The apparatus of claim 46 above, wherein the first operator is selected from a group comprising: (1) a join operator, (2) a full outer join operator, (3) a one-sided outer join operator, and (4) an intersect operator.

49. The apparatus of claim 46 above, wherein the means for applying further comprises means for replacing:

$$\sigma_{p_X}\left( X \overset{J_{XY}}{\bowtie} Y \right)$$

with:

$$\sigma_{p_X}(X) \overset{J_{XY}}{\bowtie} \sigma_{p_Y}(Y)$$

when $p_X \wedge J_{XY} \rightarrow p_Y$, wherein $X=(R_X, V_X, E_X)$ and $Y=(R_Y, V_Y, E_Y)$ are relational expressions, $p_X$ is a selection predicate on $X$, $p_Y$ is a selection predicate on $Y$, $J_{XY}$ is a null-intolerant join/outer join predicate, $\bowtie$ is a join operator, and $\sigma$ is a selection operator.

50. The apparatus of claim 46 above, wherein the means for applying further comprises means for replacing:

$$\sigma_{p_X}\left( X \overset{J_{XY}}{\rightarrow} Y \right)$$

with:

$$\sigma_{p_X}(X) \overset{J_{XY}}{\rightarrow} \sigma_{p_Y}(Y)$$

when $p_X \wedge J_{XY} \rightarrow p_Y$, wherein $X=(R_X, X_X, E_X)$ and $Y=(R_Y, V_Y, E_Y)$ are relational expressions, $p_X$ is a selection predicate on $X$, $p_Y$ is a selection predicate on $Y$, $J_{XY}$ is a null-intolerant join/outer join predicate, $\rightarrow$ is a left outer join operator, and $\sigma$ is a selection operator.

51. The apparatus of claim 46 above, wherein the means for applying further comprises means for replacing:

$$\sigma_{p_X}(X) \overset{J_{XY}}{\rightarrow} Y$$

with:

$$\sigma_{p_X}(X) \overset{J_{XY}}{\rightarrow} \sigma_{p_Y}(Y)$$

when $p_X \wedge J_{XY} \rightarrow p_Y$, wherein $X=(R_X, V_X, E_X)$ and $Y=(R_Y, V_Y, E_Y)$ are relational expressions, $p_X$ is a selection predicate on $X$, $p_Y$ is a selection predicate on $Y$, $J_{XY}$ is a null-intolerant join/outer join predicate, $\rightarrow$ is a left outer join operator, and $\sigma$ is a selection operator.

52. The apparatus of claim 46 above, wherein the means for applying further comprises means for replacing:

$$\sigma_{p_Y}\left( X \overset{J_{XY}}{\bowtie} Y \right)$$

with:

$$\sigma_{p_X}(X) \overset{J_{XY}}{\bowtie} \sigma_{p_Y}(Y)$$

when $p_Y \wedge J_{XY} \rightarrow p_X$, wherein $X=(R_X, V_X, E_X)$ and $Y=(R_Y, V_Y, E_Y)$ are relational expressions, $p_X$ is a selection predicate on $X$, $p_Y$ is a selection predicate on $Y$, $J_{XY}$ is a null-intolerant join/outer join predicate, $\bowtie$ is a join operator, and $\sigma$ is a selection operator.

53. The apparatus of claim 46 above, wherein the means for applying further comprises means for replacing:

$$\sigma_p(X \cap Y)$$

with:

$$\sigma_{p_X}(X) \cap \sigma_{p_Y}(Y)$$

wherein $X=(R_X, V_X, E_X)$ and $Y=(R_Y, V_Y, E_Y)$ are relational expressions, $p$ is a predicate on output attributes of an intersection operation $\cap \in (\cap_d, \cap_a)$, $\cap_a$ is an intersect all operator, $\cap_d$ is an intersect distinct operator, $p_X$ is a selection predicate on operand $X$, $p_Y$ is a selection predicate on operand $Y$, $p_X$ and $p_Y$ are obtained from $p$ by renaming attributes referenced in $p$ to corresponding attributes in the operands $X$ and $Y$ respectively, $\bowtie$ is a join operator, and $\sigma$ is a selection operator.

54. The apparatus of claim 46 above, wherein the means for applying further comprises means for replacing:

$$\sigma_{p_X}(X) \cap Y$$

with:

$$\sigma_p(X \cap Y)$$

wherein $X=(R_X, V_X, E_X)$ and $Y=(R_Y, V_Y, E_Y)$ are relational expressions, $p$ is a predicate on output attributes of an intersection operation $\cap \in (\cap_d, \cap_a) \cap_a$ is an intersect all operator, $\cap_d$ is an intersect distinct operator, $p_X$ is a selection predicate on operand $X$, $p_Y$ is a selection predicate on operand $Y$, $p_X$ and $p_Y$ are obtained from $p$ by renaming attributes referenced in $p$ to corresponding attributes in the operands $X$ and $Y$, respectively, and $\sigma$ is a selection operator.

55. The apparatus of claim 46 above, wherein the means for applying further comprises means for replacing:

$$\left( \ldots \left( X \overset{J_{XY}}{\bowtie} Y \right) \ldots \right) \cap Z$$

with:

$$\left( \ldots \left( X \overset{J_{XY}}{\bowtie} Y \right) \ldots \right) \cap \sigma_p(Z)$$

wherein $X=(R_X, X_X, E_X)$, $Y=(R_Y, V_Y, E_Y)$, and $Z=(R_Z, V_Z, E_Z)$ are relational expressions, $p$ is a predicate on output attributes of an intersection operation $\cap \in (\cap_d, \cap_a)$, $\cap_a$ is an intersect all operator, $\cap_d$ is an intersect distinct operator, $p$ is obtained by replacing each attribute in $J_{XY}$ by their corresponding union-compatible attributes from $Z$, $\bowtie$ is a join operator, and $\sigma_p$ is a selection operator.

56. A program storage device readable by a computer, tangibly embodying a program of instructions executable by the computer to perform method steps for simplifying an SQL query in a computer having a memory, the SQL query being performed by the computer to retrieve data from a relational database stored in an electronic storage device coupled to the computer, the method comprising the steps of:
(a) iteratively calculating, in the memory of the computer, a strong set of attributes referenced in the query; and
(b) iteratively replacing, in the memory of the computer, full, left, and right outer join operations found in one or more operands of an intersection operation in the query with outer and inner join operations using the strong set of attributes until no more simplification is possible.

57. The method as set forth in claim 56 above, wherein an attribute A is a member of the strong set of attributes when all tuples defined on schemas containing A have non-null values for attribute A.

58. The method as set forth in claim 56 above, wherein an attribute A is a member of the strong set of attributes when the attribute A is referenced through null-intolerant selection and join predicates.

59. The method as set forth in claim 56 above, wherein an attribute A is a member of the strong set of attributes when all tuples defined on schemas containing A have exactly the same non-null value for attribute A.

60. The method as set forth in claim 56 above, wherein an attribute A is a member of the strong set of attributes when a selection operator referencing the attribute A assigns a constant value to the attribute A.

61. The method as set forth in claim 56 above, wherein the iteratively replacing step comprises the step of replacing a first expression in the query with a second expression, wherein the first expression comprises:

$$X_1 \underset{\bowtie}{P} ((X_2 \to X_3) \cap X_4)$$

and the second expression comprises:

$$X_1 \underset{\bowtie}{P} ((X_2 \bowtie X_3) \cap X_4)$$

wherein $X_i = (R_i, V_i, E_i)$ are relational expressions for $1 \leq i \leq 4$, p is a null-intolerant predicate, $sch(p) \cap R_3 \neq \emptyset$, $\bowtie$ is a join operator, $\to$ is a left outer join operator, $\cap_a$ is an intersect all operator, $\cap_d$ is an intersect distinct operator, and $\cap \in \{\cap_a, \cap_d\}$.

62. The method as set forth in claim 56 above, wherein the iteratively replacing step comprises the step of replacing a first expression in the query with a second expression, wherein the first expression comprises:

$$X_1 \underset{\bowtie}{P} ((X_2 \leftrightarrow X_3) \cap X_4)$$

and the second expression comprises:

$$X_1 \underset{\bowtie}{P} ((X_2 \to X_3) \cap X_4)$$

wherein $X_i = (R_i, V_i, E_i)$ are relational expressions for $1 \leq i \leq 4$, p is a null-intolerant predicate, $sch(p) \cap R_2 \neq \emptyset$, $\to$ is a left outer join operator, $\leftrightarrow$ is a full outer join operator, $\cap_a$ is an intersect all operator, $\cap_d$ is an intersect distinct operator, and $\cap \in \{\cap_a, \cap_d\}$.

63. The method as set forth in claim 56 above, wherein the iteratively replacing step comprises the step of replacing a first expression in the query with a second expression, wherein the first expression comprises:

$$X_1 \underset{\bowtie}{P} ((X_2 \leftrightarrow X_3) \cap X_4)$$

and the second expression comprises:

$$X_1 \underset{\bowtie}{P} ((X_2 \bowtie X_3) \cap X_4)$$

wherein $X_i = (R_i, V_i, E_i)$ are relational expressions for $1 \leq i \leq 4$, p is a null-intolerant predicate, $sch(p) \cap R_2 \neq \emptyset$, $sch(p) \cap R_3 \neq \emptyset$, $\bowtie$ is a join operator, $\leftrightarrow$ is a full outer join operator, $\cap_a$ is an intersect all operator, $\cap_d$ is an intersect distinct operator, and $\cap \in \{\cap_a, \cap_d\}$.

64. The method as set forth in claim 56 above, wherein the iteratively replacing step comprises the step of replacing a first expression in the query with a second expression, wherein the first expression comprises:

$$X_1 \underset{\to}{P} ((X_2 \to X_3) \cap X_4)$$

and the second expression comprises:

$$X_1 \underset{\to}{P} ((X_2 \bowtie X_3) \cap X_4)$$

wherein $X_i = (R_i, V_i, E_i)$ are relational expressions for $1 \leq i \leq 4$, p is a null-intolerant predicate, $sch(p) \cap R_3 \neq \emptyset$, $\bowtie$ is a join operator, $\to$ is a left outer join operator, $\cap_a$ is an intersect all operator, $\cap_d$ is an intersect distinct operator, and $\cap \in \{\cap_a, \cap_d\}$.

65. The method as set forth in claim 56 above, wherein the iteratively replacing step comprises the step of replacing a first expression in the query with a second expression, wherein the first expression comprises:

$$X_1 \underset{\to}{P} ((X_2 \leftrightarrow X_3) \cap X_4)$$

and the second expression comprises:

$$X_1 \underset{\to}{P} ((X_2 \to X_3) \cap X_4)$$

wherein $X_i = (R_i, V_i, E_i)$ are relational expressions for $1 \leq i \leq 4$, p is a null-intolerant predicate, $sch(p) \cap R_3 \neq \emptyset$, $\to$ is a left outer join operator, $\leftrightarrow$ is a full outer join operator, $\cap_a$ is an intersect all operator, $\cap_d$ is an intersect distinct operator, and $\cap \in \{\cap_a, \cap_d\}$.

66. The method as set forth in claim 56 above, wherein the iteratively replacing step comprises the step of replacing a first expression in the query with a second expression, wherein the first expression comprises:

$$X_1 \underset{\to}{P} ((X_2 \leftrightarrow X_3) \cap X_4)$$

and the second expression comprises:

$$X_1 \underset{\to}{P} ((X_2 \bowtie X_3) \cap X_4)$$

wherein $X_i = (R_i, V_i, E_i)$ are relational expressions for $1 \leq i \leq 4$, p is a null-intolerant predicate, $sch(p) \cap R_2 \neq \emptyset$, $sch(p) \cap R_3 \neq \emptyset$, $\bowtie$ is a join operator, $\to$ is a left outer join operator, $\leftrightarrow$ is a full outer join operator, $\cap_a$ is an intersect all operator, $\cap_d$ is an intersect distinct operator, and $\cap \in \{\cap_a, \cap_d\}$.

67. The method as set forth in claim 56 above, wherein the iteratively replacing step comprises the step of replacing a first expression in the query with a second expression, wherein the first expression comprises:

$$X_1 \underset{\cap}{P^*} (X_2 \bowtie X_3)$$

and the second expression comprises:

$$X_1 \underset{\cap}{P^*} (X_2 \bowtie X_3)$$

wherein $X_i = (R_i, V_i, E_i)$ are relational expressions for $1 \leq i \leq 4$, p* is a join reduced predicate in an attribute in $R_3$, $\bowtie$ is a join operator, $\to$ is a left outer join operator, $\cap_a$ is an intersect all operator, $\cap_d$ is an intersect distinct operator, and $\cap \in \{\cap_a, \cap_d\}$.

68. The method as set forth in claim 56 above, wherein the iteratively replacing step comprises the step of replacing a first expression in the query with a second expression, wherein the first expression comprises:

$$X_1 \underset{\cap}{p^*} (X_2 \bowtie X_3)$$

and the second expression comprises:

$$X_1 \underset{\cap}{p^*} (X_2 \rightarrow X_3)$$

wherein $X_i=(R_i, V_i, E_i)$ are relational expressions for $1 \leq i \leq 4$, $p^*$ is a join reduced predicate in an attribute in $R_2$, $\rightarrow$ is a left outer join operator, $\leftrightharpoons$ is a full outer join operator, $\cap_a$ is an intersect all operator, $\cap_d$ is an intersect distinct operator, and $\cap \in \{\cap_a, \cap_d\}$.

69. The method as set forth in claim 56 above, wherein the iteratively replacing step comprises the step of replacing a first expression in the query with a second expression, wherein the first expression comprises:

$$X_1 \underset{\cap}{p^*} (X_2 - X_3)$$

and the second expression comprises:

$$X_1 \underset{\cap}{p^*} (X_2 \bowtie X_3)$$

wherein $X_i=(R_i, V_i, E_i)$ are relational expressions for $1 \leq i \leq 4$, $p^*$ is a join reduced predicate in an attribute in $R_2$ and $R_3$, $\bowtie$ is a join operator, $\leftrightharpoons$ is a full outer join operator, $\cap_a$ is an intersect all operator, $\cap_d$ is an intersect distinct operator, and $\cap \in \{\cap_a, \cap_d\}$.

70. The method as set forth in claim 56 above, further comprising the steps of:
   (1) iteratively calculating a strong set of attributes referenced in a sub-expression of the query; and
   (2) iteratively replacing full, left, and right outer join operations in the sub-expression with outer and inner join operations using the strong set of attributes for the sub-expression until no more simplification is possible.

71. A program storage device readable by a computer, tangibly embodying a program of instructions executable by the computer to perform method steps for simplifying an SQL query in a computer having a memory, the SQL query being performed by the computer to retrieve data from a relational database stored in an electronic storage device coupled to the computer, the method comprising the steps of:
   (a) generating an expression tree to represent the query in the memory of the computer, the expression tree comprised of a set of leaves corresponding to relations referenced in the query, and a set of inner nodes corresponding to operators occurring in the query;
   (b) generating a strong set of attributes for the expression tree in the memory of the computer;
   (c) traversing the expression tree in the memory of the computer until a node representing an intersection operator is encountered;
   (d) simplifying a subtree of the expression tree below the intersection operator in the memory of the computer;
   (e) re-generating the strong set of attributes for the subtree in the memory of the computer; and
   (f) repeating steps (b)–(e) until the strong set of attributes does not change.

72. The method as set forth in claim 71 above, wherein the strong set of attributes is comprised of one or more attributes A, such that all tuples defined on schemas containing A have non-null values for attribute A.

73. The method as set forth in claim 71 above, wherein the strong set of attributes is comprised of one or more attributes A, wherein the attribute A is referenced through null-intolerant selection and join predicates.

74. The method as set forth in claim 71 above, wherein the strong set of attributes is comprised of one or more attributes A, such that all tuples defined on schemas containing A have exactly the same non-null value for attribute A.

75. The method as set forth in claim 71 above, wherein the strong set of attributes is comprised of one or more attributes A, wherein a selection operator referencing the attribute A assigns a constant value to the attribute A.

76. The method as set forth in claim 71 above, wherein the simplifying step comprises replacing an outer join operation with a join operation.

77. The method as set forth in claim 71 above, wherein the simplifying step comprises replacing a full outer join operation with a one-sided outer join operation.

78. A program storage device readable by a computer, tangibly embodying a program of instructions executable by the computer to perform method steps for simplifying an SQL query in a computer having a memory, the SQL query being performed by the computer to retrieve data from a relational database stored in an electronic storage device coupled to the computer, the method comprising the steps of:
   (a) examining query in the memory of the computer to identify instances where a selection operator is applied to a result of a sub-expression, wherein the sub-expression comprises a first operator applied to first and second operand tables;
   (b) identifying, in the memory of the computer, classes of attributes for the selection operator and the sub-expression that are equated through the first operator in the sub-expression;
   (c) generating, in the memory of the computer, selection predicates from the identified classes; and
   (d) applying, in the memory of the computer, selection operators to the first and second operand tables using the generated selection predicates before the first operator is performed, thereby making intermediate results from the first operator smaller.

79. The method of claim 78 above, wherein the first operator is selected from a group comprising: (1) a join operator, (2) a full outer join operator, (3) a one-sided outer join operator, and (4) an intersect operator.

80. The method of claim 78 above, wherein the applying step further comprises the step of replacing:

$$\sigma_{p_X}\left(X \underset{\bowtie}{J_{XY}} Y\right)$$

with:

$$\sigma_{p_X}(X) \underset{\bowtie}{J_{XY}} \sigma_{p_Y}(Y)$$

when $p_X \wedge J_{XY} \rightarrow p_Y$, wherein $X=(R_X, V_X, E_X)$ and $Y=(R_Y, V_Y, E_Y)$ are relational expressions, $p_X$ is a selection predicate on X, $p_Y$ is a selection predicate on Y, $J_{XY}$ is a null-intolerant join/outer join predicate, $\bowtie$ is a join operator, and $\sigma$ is a selection operator.

81. The method of claim 78 above, wherein the applying step further comprises the step of replacing:

$$\sigma_{p_X}\left(X \stackrel{J_{XY}}{\rightarrow} Y\right)$$

with:

$$\sigma_{p_X}(X) \stackrel{J_{XY}}{\rightarrow} \sigma_{p_Y}(Y)$$

when $p_X \wedge J_{XY} \rightarrow p_Y$, wherein $X=(R_X, V_X, E_X)$ and $Y=(R_Y, V_Y, E_Y)$ are relational expressions, $p_X$ is a selection predicate on X, $p_Y$ is a selection predicate on Y, $J_{XY}$ is a null-intolerant join/outer join predicate, $\rightarrow$ is a left outer join operator, and $\sigma$ is a selection operator.

82. The method of claim 78 above, wherein the applying step further comprises the step of replacing:

$$\sigma_{p_X}(X) \stackrel{J_{XY}}{\rightarrow} Y$$

with:

$$\sigma_{p_X}(X) \stackrel{J_{XY}}{\rightarrow} \sigma_{p_Y}(Y)$$

when $p_X \wedge J_{XY} \rightarrow p_Y$, wherein $X=(R_X, V_X, E_X)$ and $Y=(R_Y, V_Y, E_Y)$ are relational expressions, $p_X$ is a selection predicate on X, $p_Y$ is a selection predicate on Y, $J_{XY}$ is a null-intolerant join/outer join predicate, $\rightarrow$ is a left outer join operator, and $\sigma$ is a selection operator.

83. The method of claim 78 above, wherein the applying step further comprises the step of replacing:

$$\sigma_{p_Y}\left(X \stackrel{J_{XY}}{\bowtie} Y\right)$$

with:

$$\sigma_{p_X}(X) \stackrel{J_{XY}}{\bowtie} \sigma_{p_Y}(Y)$$

when $p_Y \wedge J_{XY} \rightarrow p_X$, wherein $X=(R_X, V_X, E_X)$ and $Y=(R_Y, V_Y, E_Y)$ are relational expressions, $p_X$ is a selection predicate on X, $p_Y$ is a selection predicate on Y, $J_{XY}$ is a null-intolerant join/outer join predicate, $\bowtie$ is a join operator, and $\sigma$ is a selection operator.

84. The method of claim 78 above, wherein the applying step further comprises the step of replacing:

$$\sigma_p(X \cap Y)$$

with:

$$\sigma_{p_X}(X) \cap \sigma_{p_Y}(Y)$$

wherein $X=(R_X, V_X, E_X)$ and $Y=(R_Y, V_Y, E_Y)$ are relational expressions, p is a predicate on output attributes of an intersection operation $\cap \in (\cap_d, \cap_a)$, $\cap_a$ is an intersect all operator, $\cap_d$ is an intersect distinct operator, $p_X$ is a selection predicate on operand X, $p_Y$ is a selection predicate on operand Y, $p_X$ and $p_Y$ are obtained from p by renaming attributes referenced in p to corresponding attributes in the operands X and Y, respectively, $\bowtie$ is a join operator, and $\sigma$ is a selection operator.

85. The method of claim 78 above, wherein the applying step further comprises the step of replacing:

$$\sigma_{p_X}(X) \cap Y$$

with:

$$\sigma_p(\cap Y)$$

wherein $X=(R_X, V_X, E_X)$ and $Y=(R_Y, V_Y, E_Y)$ are relational expressions, p is a predicate on output attributes of an intersection operation $\cap \in (\cap_d, \cap_a)$, $\cap_a$ is an intersect all operator, $\cap_d$ is an intersect distinct operator, $p_X$ is a selection predicate on operand X, $p_Y$ is a selection predicate on operand Y, $p_X$ and $p_Y$ are obtained from p by renaming attributes referenced in p to corresponding attributes in the operands X and Y, respectively, and $\sigma$ is a selection operator.

86. The method of claim 78 above, wherein the applying step further comprises the step of replacing:

$$\left(\ldots\left(X \stackrel{J_{XY}}{\bowtie} Y\right)\ldots\right) \cap Z$$

with:

$$\left(\ldots\left(X \stackrel{J_{XY}}{\bowtie} Y\right)\ldots\right) \cap \sigma_p(Z)$$

wherein $X=(R_X, X_X, E_X)$, $Y=(R_Y, V_Y, E_Y)$, and $Z=(R_Z, V_Z, E_Z)$ are relational expressions, p is a predicate on output attributes of an intersection operation $\cap \in (\cap_d, \cap_a)$, $\cap_a$ is an intersect all operator, $\cap_d$ is an intersect distinct operator, p is obtained by replacing each attribute in $J_{XY}$ by their corresponding union-compatible attributes from Z, $\bowtie$ is a join operator and $\sigma_p$ is a selection operator.

\* \* \* \* \*